United States Patent
Takano et al.

(10) Patent No.: US 11,112,566 B2
(45) Date of Patent: Sep. 7, 2021

(54) REMOVAL TOOL FOR REMOVING A PLURAL OF MICRO OPTICAL CONNECTORS FROM AN ADAPTER INTERFACE

(71) Applicant: SENKO ADVANCED COMPONENTS, INC., Marlborough, MA (US)

(72) Inventors: Kazuyoshi Takano, Southborough, MD (US); Jimmy Jun-Fu Chang, Worcester, MA (US)

(73) Assignee: Senko Advanced Components, Inc., Marlborough (MA)

( * ) Notice: Subject to any disclaimer, the term of this patent is extended or adjusted under 35 U.S.C. 154(b) by 0 days.

(21) Appl. No.: 16/358,038

(22) Filed: Mar. 19, 2019

(65) Prior Publication Data
US 2019/0285806 A1    Sep. 19, 2019

Related U.S. Application Data

(60) Provisional application No. 62/644,776, filed on Mar. 19, 2018.

(51) Int. Cl.
*G02B 6/38*    (2006.01)

(52) U.S. Cl.
CPC ........... *G02B 6/387* (2013.01); *G02B 6/3825* (2013.01); *G02B 6/3893* (2013.01)

(58) Field of Classification Search
CPC ..... G02B 6/387; G02B 6/3893; G02B 6/3825
USPC .......................................................... 385/78
See application file for complete search history.

(56) References Cited

U.S. PATENT DOCUMENTS

| | | | |
|---|---|---|---|
| 3,721,945 A | 3/1973 | Hults | |
| 4,150,790 A | 4/1979 | Potter | |
| 4,279,467 A * | 7/1981 | Borsuk | G02B 6/3847 385/65 |
| 4,327,964 A | 5/1982 | Haesly | |
| 4,425,704 A | 1/1984 | Cline | |
| 4,478,473 A | 10/1984 | Frear | |

(Continued)

FOREIGN PATENT DOCUMENTS

| | | |
|---|---|---|
| CA | 2495693 C | 4/2004 |
| CN | 2836038 Y | 11/2006 |

(Continued)

OTHER PUBLICATIONS

ISR Application No. PCT/US2019/022940 dated Sep. 10, 2019, pp. 5.

(Continued)

*Primary Examiner* — Kaveh C Kianni
(74) *Attorney, Agent, or Firm* — Stinson LLP

(57) ABSTRACT

An optical connector holding two or more LC-type optical ferrules is provided. A plural of optical connectors are ganged together into when insert into an adapter. To remove the connectors together or individually a removal tool is attachable to one or more of the connectors. The removal tool has a plural of release arms that in first position can release the fiber optic connector from the adapter receptacle. Release aim in a second position prevents the fiber optic connector from being released from the adapter receptacle. The removal tool is moved distally to actuate or retain the fiber optic connectors within their corresponding adapter receptacle.

5 Claims, 19 Drawing Sheets

(56) References Cited

U.S. PATENT DOCUMENTS

| | | |
|---|---|---|
| 4,762,388 A | 8/1988 | Tanaka |
| 4,764,129 A | 8/1988 | Jones |
| 4,840,451 A | 6/1989 | Sampson |
| 4,872,736 A | 10/1989 | Myers |
| 4,979,792 A | 12/1990 | Weber |
| 5,026,138 A | 6/1991 | Boudreau |
| 5,041,025 A | 8/1991 | Haitmanek |
| D323,143 S | 1/1992 | Ohkura |
| 5,146,813 A | 9/1992 | Stanfill, Jr. et al. |
| 5,212,752 A | 5/1993 | Stephenson |
| 5,265,181 A | 11/1993 | Chang |
| 5,289,554 A | 2/1994 | Cubukciyan |
| 5,317,663 A | 5/1994 | Beard |
| 5,335,301 A | 8/1994 | Newman |
| 5,348,487 A | 9/1994 | Marazzi |
| 5,418,875 A | 5/1995 | Nakano |
| 5,444,806 A | 8/1995 | de Marchi |
| 5,481,634 A | 1/1996 | Anderson |
| 5,506,922 A | 4/1996 | Grois |
| 5,521,997 A | 5/1996 | Rovenolt |
| 5,570,445 A | 10/1996 | Chou |
| 5,588,079 A | 12/1996 | Tanabe |
| 5,600,747 A * | 2/1997 | Yamakawa ........... G02B 6/3879 385/59 |
| 5,602,951 A | 2/1997 | Shiota |
| 5,684,903 A | 11/1997 | Kyomasu |
| 5,687,268 A | 11/1997 | Stephenson |
| 5,689,598 A * | 11/1997 | Dean, Jr. .............. G02B 6/3879 385/53 |
| 5,781,681 A | 7/1998 | Manning |
| 5,845,036 A | 12/1998 | De Marchi |
| 5,915,987 A | 6/1999 | Reed |
| 5,937,130 A | 8/1999 | Amberg |
| 5,956,444 A | 9/1999 | Duda |
| 5,971,626 A | 10/1999 | Knodell |
| 6,041,155 A | 3/2000 | Anderson |
| 6,049,040 A | 4/2000 | Biles |
| 6,095,862 A | 8/2000 | Doye |
| 6,134,370 A | 10/2000 | Childers |
| 6,178,283 B1 | 1/2001 | Weigel |
| RE37,080 E | 3/2001 | Stephenson |
| 6,206,577 B1 | 3/2001 | Hall, III |
| 6,206,581 B1 | 3/2001 | Driscoll |
| 6,227,717 B1 | 5/2001 | Ott |
| 6,238,104 B1 | 5/2001 | Yamakawa |
| 6,240,228 B1 | 5/2001 | Chen |
| 6,247,849 B1 | 6/2001 | Liu |
| 6,276,840 B1 | 8/2001 | Weiss |
| 6,363,560 B1 | 4/2002 | Kesinger |
| 6,364,537 B1 | 4/2002 | Maynard |
| 6,379,052 B1 | 4/2002 | de Jong |
| 6,422,759 B1 | 7/2002 | Kevern |
| 6,450,695 B1 | 9/2002 | Matsumoto |
| 6,461,054 B1 | 10/2002 | Iwase |
| 6,471,412 B1 | 10/2002 | Belenkiy |
| 6,478,472 B1 | 11/2002 | Anderson |
| 6,485,194 B1 | 11/2002 | Shirakawa |
| 6,530,696 B1 | 3/2003 | Ueda |
| 6,551,117 B2 | 4/2003 | Poplawski |
| 6,565,262 B2 | 5/2003 | Childers |
| 6,579,014 B2 | 6/2003 | Melton |
| 6,585,194 B1 | 7/2003 | Brhwood |
| 6,634,796 B2 | 10/2003 | de Jong |
| 6,634,801 B1 | 10/2003 | Waldron |
| 6,648,520 B2 | 11/2003 | McDonald |
| 6,668,113 B2 | 12/2003 | Togami |
| 6,682,228 B2 | 1/2004 | Rathnam |
| 6,685,362 B2 | 2/2004 | Burkholder |
| 6,695,486 B1 | 2/2004 | Falkenberg |
| 6,854,894 B1 | 2/2005 | Yunker |
| 6,869,227 B2 | 3/2005 | Del Grosso |
| 6,872,039 B2 | 3/2005 | Ba |
| 6,935,789 B2 | 8/2005 | Gross, III |
| 7,036,993 B2 | 5/2006 | Luther |
| 7,052,186 B1 | 5/2006 | Bates |
| 7,077,576 B2 | 7/2006 | Luther |
| 7,090,407 B2 | 8/2006 | Melton |
| 7,091,421 B2 | 8/2006 | Kukita |
| 7,111,990 B2 | 9/2006 | Melton |
| 7,113,679 B2 | 9/2006 | Melton |
| D533,504 S | 12/2006 | Lee |
| D534,124 S | 12/2006 | Taguchi |
| 7,150,567 B1 | 12/2006 | Luther |
| 7,153,041 B2 | 12/2006 | Mine |
| 7,198,409 B2 | 4/2007 | Smith |
| 7,207,724 B2 | 4/2007 | Gurreri |
| D543,124 S | 5/2007 | Raatikainen |
| D543,146 S | 5/2007 | Chen |
| 7,258,493 B2 | 8/2007 | Milette |
| 7,264,402 B2 | 9/2007 | Theuerkorn |
| 7,281,859 B2 | 10/2007 | Mudd |
| D558,675 S | 1/2008 | Chien |
| 7,315,682 B1 | 1/2008 | En Lin |
| 7,325,976 B2 | 2/2008 | Gurreri |
| 7,325,980 B2 | 2/2008 | Pepe |
| 7,329,137 B2 | 2/2008 | Martin |
| 7,331,718 B2 | 2/2008 | Yazaki |
| 7,354,291 B2 | 4/2008 | Caveney |
| 7,371,082 B2 | 5/2008 | Zimmel |
| 7,387,447 B2 | 6/2008 | Mudd |
| 7,390,203 B2 | 6/2008 | Murano |
| D572,661 S | 7/2008 | En Lin |
| 7,431,604 B2 | 10/2008 | Waters |
| 7,463,803 B2 | 12/2008 | Cody |
| 7,465,180 B2 | 12/2008 | Kusuda |
| 7,473,124 B1 | 1/2009 | Briant |
| 7,510,335 B1 | 3/2009 | Su |
| 7,513,695 B1 | 4/2009 | Lin |
| 7,540,666 B2 | 6/2009 | Luther |
| 7,561,775 B2 | 7/2009 | Lin |
| 7,588,373 B1 | 9/2009 | Sato |
| 7,591,595 B2 | 9/2009 | Lu |
| 7,594,766 B1 | 9/2009 | Sasser |
| 7,641,398 B2 | 1/2010 | O'Riorden |
| 7,695,199 B2 | 4/2010 | Teo |
| 7,699,533 B2 | 4/2010 | Milette |
| 7,824,113 B2 | 11/2010 | Wong |
| 7,837,395 B2 | 11/2010 | Lin |
| D641,708 S | 7/2011 | Yamauchi |
| 8,083,450 B1 | 12/2011 | Smith |
| 8,152,385 B2 | 4/2012 | de Jong |
| 8,186,890 B2 | 5/2012 | Lu |
| 8,192,091 B2 | 6/2012 | Hsu |
| 8,202,009 B2 | 6/2012 | Lin |
| 8,221,007 B2 | 7/2012 | Peterhans |
| 8,251,733 B2 | 8/2012 | Wu |
| 8,267,595 B2 | 9/2012 | Lin |
| 8,270,796 B2 | 9/2012 | Nhep |
| 8,408,815 B2 | 4/2013 | Lin |
| 8,465,317 B2 | 6/2013 | Gniadek |
| 8,534,928 B2 | 9/2013 | Cooke |
| 8,556,645 B2 | 10/2013 | Crain |
| 8,559,781 B2 * | 10/2013 | Childers .............. G02B 6/3893 385/134 |
| 8,622,634 B2 | 1/2014 | Arnold |
| 8,636,424 B2 | 1/2014 | Kuffel |
| 8,651,749 B2 | 2/2014 | Dainese Júnior |
| 8,676,022 B2 | 3/2014 | Jones |
| 8,678,670 B2 | 3/2014 | Takahashi |
| 8,727,638 B2 | 5/2014 | Lee |
| 8,770,863 B2 | 7/2014 | Cooke |
| 9,052,474 B2 | 6/2015 | Jiang |
| 9,310,569 B2 | 4/2016 | Lee |
| 9,366,829 B2 | 6/2016 | Czosnowski |
| 9,411,110 B2 | 8/2016 | Barnette, Jr. |
| 9,465,172 B2 | 10/2016 | Shih |
| 9,494,744 B2 | 11/2016 | de Jong |
| 9,548,557 B2 | 1/2017 | Liu |
| 9,551,842 B2 | 1/2017 | Theuerkorn |
| 9,557,495 B2 | 1/2017 | Raven |
| 9,568,686 B2 | 2/2017 | Fewkes |
| 9,581,768 B1 | 2/2017 | Baca |
| 9,599,778 B2 | 3/2017 | Wong |
| 9,658,409 B2 | 5/2017 | Gniadek |

(56) References Cited

U.S. PATENT DOCUMENTS

| | | |
|---|---|---|
| 9,684,136 B2 | 6/2017 | Cline |
| 9,684,313 B2 | 6/2017 | Chajec |
| 9,709,753 B1 | 7/2017 | Chang |
| 9,778,425 B2 | 10/2017 | Nguyen |
| 9,829,644 B2 | 11/2017 | Nguyen |
| 9,829,645 B2 | 11/2017 | Good |
| 9,829,653 B1 | 11/2017 | Nishiguchi |
| 9,857,538 B2 * | 1/2018 | Nguyen ............... G02B 6/3825 |
| 9,869,825 B2 | 1/2018 | Bailey |
| 9,880,361 B2 | 1/2018 | Childers |
| 9,946,035 B2 | 4/2018 | Gtafson |
| 9,971,103 B2 | 5/2018 | de Jong |
| 10,031,296 B2 | 7/2018 | Good |
| 10,527,802 B2 * | 1/2020 | Wong ................... G02B 6/3893 |
| 2002/0172467 A1 | 11/2002 | Anderson |
| 2002/0191919 A1 | 12/2002 | Nolan |
| 2003/0053787 A1 | 3/2003 | Lee |
| 2003/0063862 A1 | 4/2003 | Fillion |
| 2003/0157825 A1 | 8/2003 | Kane |
| 2004/0052473 A1 | 3/2004 | Seo |
| 2004/0109646 A1 | 6/2004 | Anderson |
| 2004/0136657 A1 | 7/2004 | Ngo |
| 2004/0141693 A1 | 7/2004 | Szilagyi |
| 2004/0161958 A1 | 8/2004 | Togami |
| 2004/0234209 A1 | 11/2004 | Cox |
| 2004/0247252 A1 | 12/2004 | Ehrenreich |
| 2005/0111796 A1 | 5/2005 | Matasek |
| 2005/0141817 A1 | 6/2005 | Yazaki |
| 2005/0229394 A1 * | 10/2005 | Nelson ................... H01R 43/26 29/876 |
| 2006/0013539 A1 | 1/2006 | Thaler |
| 2006/0089049 A1 | 4/2006 | Sedor |
| 2006/0127025 A1 | 6/2006 | Haberman |
| 2006/0160429 A1 | 7/2006 | Dawiedczyk |
| 2006/0193562 A1 | 8/2006 | Theuerkorn |
| 2006/0269194 A1 | 11/2006 | Luther |
| 2006/0274411 A1 | 12/2006 | Yamauchi |
| 2007/0025665 A1 | 2/2007 | Dean |
| 2007/0028409 A1 | 2/2007 | Yamada |
| 2007/0079854 A1 | 4/2007 | You |
| 2007/0098329 A1 | 5/2007 | Shimoji |
| 2007/0149062 A1 | 6/2007 | Long |
| 2007/0230874 A1 | 10/2007 | Lin |
| 2007/0232115 A1 | 10/2007 | Burke |
| 2007/0243749 A1 | 10/2007 | Wu |
| 2008/0008430 A1 | 1/2008 | Kewitsch |
| 2008/0044137 A1 | 2/2008 | Luther |
| 2008/0069501 A1 | 3/2008 | Mudd |
| 2008/0101757 A1 | 5/2008 | Lin |
| 2008/0226237 A1 | 9/2008 | O'Riorden |
| 2008/0267566 A1 | 10/2008 | En Lin |
| 2008/0311781 A1 | 12/2008 | Wojcik et al. |
| 2009/0022457 A1 | 1/2009 | de Jong |
| 2009/0028507 A1 | 1/2009 | Jones |
| 2009/0092360 A1 | 4/2009 | Lin |
| 2009/0176401 A1 | 7/2009 | Gu |
| 2009/0196555 A1 | 8/2009 | Lin |
| 2009/0214162 A1 | 8/2009 | O'Riorden |
| 2009/0220197 A1 | 9/2009 | Gniadek |
| 2009/0220200 A1 | 9/2009 | Sheau Tung Wong |
| 2009/0226140 A1 * | 9/2009 | Belenkiy .............. G02B 6/3898 385/134 |
| 2009/0290839 A1 | 11/2009 | Lin |
| 2009/0290938 A1 | 11/2009 | Asaoka |
| 2010/0034502 A1 | 2/2010 | Lu |
| 2010/0054668 A1 | 3/2010 | Nelson |
| 2010/0092136 A1 | 4/2010 | Nhep |
| 2010/0247041 A1 | 9/2010 | Szilagyi |
| 2010/0061069 A1 | 11/2010 | Cole |
| 2010/0284656 A1 | 11/2010 | Morra |
| 2010/0322561 A1 | 12/2010 | Lin |
| 2011/0044588 A1 | 2/2011 | Larson |
| 2011/0131801 A1 | 6/2011 | Nelson |
| 2011/0155810 A1 | 6/2011 | Taniguchi |
| 2011/0177710 A1 | 7/2011 | Tobey |
| 2011/0239220 A1 | 9/2011 | Gibson |
| 2012/0033922 A1 * | 2/2012 | Nakagawa ........... G02B 6/3879 385/78 |
| 2012/0099822 A1 | 4/2012 | Kuffel |
| 2012/0155810 A1 | 6/2012 | Nakagawa |
| 2012/0189260 A1 | 7/2012 | Kowalczyk |
| 2012/0237177 A1 | 9/2012 | Minota |
| 2012/0269485 A1 | 10/2012 | Haley |
| 2012/0301080 A1 | 11/2012 | Gniadek |
| 2013/0019423 A1 | 1/2013 | Srutkowski |
| 2013/0051733 A1 * | 2/2013 | Gallegos ............. G02B 6/3879 385/76 |
| 2013/0071067 A1 | 3/2013 | Lin |
| 2013/0089995 A1 | 4/2013 | Gniadek |
| 2013/0094816 A1 | 4/2013 | Lin |
| 2013/0121653 A1 | 5/2013 | Shitama |
| 2013/0170797 A1 | 7/2013 | Ott |
| 2013/0183012 A1 | 7/2013 | Cabanne Lopez |
| 2013/0216185 A1 | 8/2013 | Klavuhn |
| 2013/0259429 A1 | 10/2013 | Czosnowski |
| 2013/0308915 A1 | 11/2013 | Buff |
| 2013/0322825 A1 | 12/2013 | Cooke |
| 2014/0016901 A1 | 1/2014 | Lambourn |
| 2014/0023322 A1 | 1/2014 | Gniadek |
| 2014/0050446 A1 | 2/2014 | Chang |
| 2014/0056562 A1 | 2/2014 | Limbert |
| 2014/0133808 A1 | 5/2014 | Hill |
| 2014/0178007 A1 * | 6/2014 | Momotsu ............. G02B 6/3849 385/77 |
| 2014/0219621 A1 | 8/2014 | Barnette, Jr. |
| 2014/0226946 A1 | 8/2014 | Cooke |
| 2014/0241644 A1 | 8/2014 | Kang |
| 2014/0241678 A1 | 8/2014 | Bringuier |
| 2014/0241688 A1 | 8/2014 | Isenhour |
| 2014/0334780 A1 | 11/2014 | Nguyen |
| 2014/0348477 A1 | 11/2014 | Chang |
| 2015/0003788 A1 | 1/2015 | Chen |
| 2015/0111417 A1 | 4/2015 | Vanderwoud |
| 2015/0198766 A1 | 7/2015 | Takahashi et al. |
| 2015/0212282 A1 | 7/2015 | Lin |
| 2015/0301294 A1 | 10/2015 | Chang |
| 2015/0331201 A1 | 11/2015 | Takano |
| 2015/0355417 A1 | 12/2015 | Takano |
| 2015/0378113 A1 | 12/2015 | Good |
| 2016/0109661 A1 * | 4/2016 | Foung ................. G02B 6/3825 385/76 |
| 2016/0131849 A1 | 5/2016 | Takano |
| 2016/0172852 A1 | 6/2016 | Tamura |
| 2016/0178852 A1 | 6/2016 | Takano |
| 2016/0195682 A1 | 7/2016 | Takano |
| 2016/0259135 A1 | 9/2016 | Gniadek |
| 2016/0266326 A1 | 9/2016 | Gniadek |
| 2016/0291262 A1 | 10/2016 | Chang |
| 2016/0320572 A1 | 11/2016 | Gniadek |
| 2016/0349458 A1 | 12/2016 | Murray |
| 2016/0370545 A1 | 12/2016 | Jiang |
| 2017/0003458 A1 | 1/2017 | Gniadek |
| 2017/0077641 A1 * | 3/2017 | Kleeberger ............ H01R 43/26 |
| 2017/0205572 A1 | 7/2017 | Chang et al. |
| 2017/0212316 A1 | 7/2017 | Takano et al. |
| 2017/0276887 A1 | 9/2017 | Allen |
| 2017/0343740 A1 | 11/2017 | Nguyen |
| 2018/0156988 A1 | 6/2018 | Gniadek |
| 2018/0172923 A1 | 6/2018 | Bauco |
| 2018/0217338 A1 * | 8/2018 | Takano ................ G02B 6/403 |
| 2018/0217340 A1 * | 8/2018 | Wong .................. G02B 6/3821 |
| 2018/0292612 A1 * | 10/2018 | Chang ................. G02B 6/3881 |
| 2019/0018201 A1 * | 1/2019 | Takano ............... G02B 6/3825 |
| 2019/0154924 A1 * | 5/2019 | Chang ................ G02B 6/3831 |
| 2019/0278028 A1 * | 9/2019 | Higley ................ G02B 6/3825 |
| 2019/0310432 A1 * | 10/2019 | Chang ................. G02B 6/3893 |

FOREIGN PATENT DOCUMENTS

| | | |
|---|---|---|
| CN | 201383588 Y | 1/2010 |
| CN | 2026500189 U | 12/2013 |
| DE | 202006011910 U1 | 3/2007 |
| DE | 102006019335 A1 | 10/2007 |

(56) References Cited

FOREIGN PATENT DOCUMENTS

| | | | |
|---|---|---|---|
| EP | 1074868 | A1 | 7/2001 |
| EP | 1211537 | A2 | 6/2002 |
| EP | 1245980 | B1 | 6/2006 |
| EP | 1566674 | B1 | 5/2009 |
| GB | 2111240 | B | 9/1985 |
| JP | 2009229545 | A | 10/2009 |
| JP | 2009276493 | A | 11/2009 |
| TW | 200821653 | A | 5/2008 |
| WO | 2001/079904 | A2 | 10/2001 |
| WO | 2004/027485 | A1 | 4/2004 |
| WO | 2008/112986 | A1 | 9/2008 |
| WO | 2009/135787 | A1 | 11/2009 |
| WO | 2010/024851 | A2 | 3/2010 |
| WO | 2012/136702 | A1 | 10/2012 |
| WO | 2012/162385 | A1 | 11/2012 |
| WO | 2014/028527 | A1 | 2/2014 |
| WO | 2014/182351 | A1 | 11/2014 |
| WO | 2015/191024 | A1 | 12/2015 |
| WO | 2016/148741 | A1 | 9/2016 |
| WO | 2019/106870 | A1 | 6/2019 |
| WO | 2019/126333 | A1 | 6/2019 |
| WO | 2019/126337 | A1 | 6/2019 |
| WO | WO 2019-53995 | A  * | 6/2019 .......... G02B 6/3893 |
| WO | 2019/146222 | A1 | 8/2019 |
| WO | 2019/159431 | A1 | 8/2019 |

OTHER PUBLICATIONS

WO Application No. PCT/US2019/022940 dated Sep. 10, 2019, pp. 9.
Fiber Optic Interconnect Solutions, Tactical Fiber Optic Connector Cables and Termini, 2006, Glenair, Inc., Glendale, California.
Fiber Optic Connectors and Assemblies Catalog, 2009, Huber & Suhner Fiber Optics, Herisau, Switzerland.
Fiber Optic Products Catalog, Nov. 2007, Tyco Electronics Corporation, Harrisburg, Pennsylvania.
Fiber Optic Connectors Tutorial, 2018, 20 pages.
Fiber Optic Glossary, Feb. 29, 2016, 93 pages.
ISR for PCT/US2019/013861, dated Apr. 8, 2019, 3 pages.
WO for PCT/US2019/013861, Apr. 8, 2019, 11 pages.
U.S. Appl. No. 62/607,555, filed Dec. 19, 2017, 53 pages.

* cited by examiner

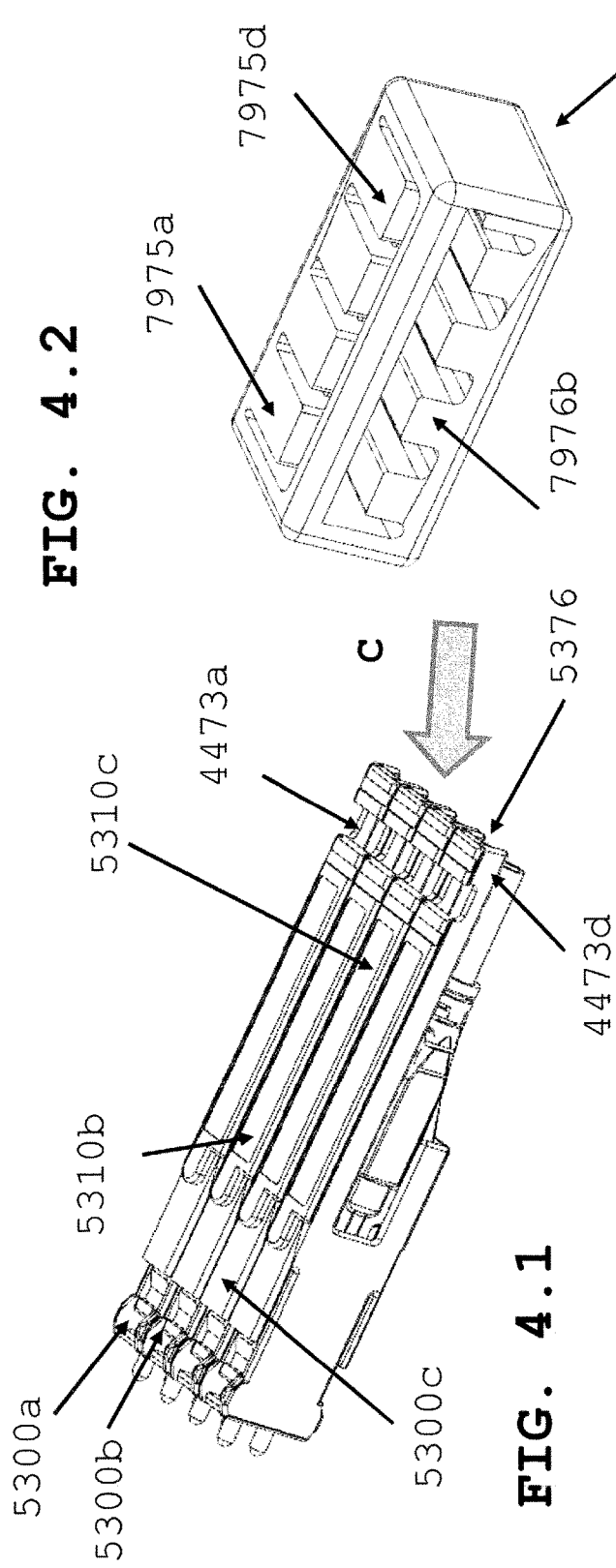
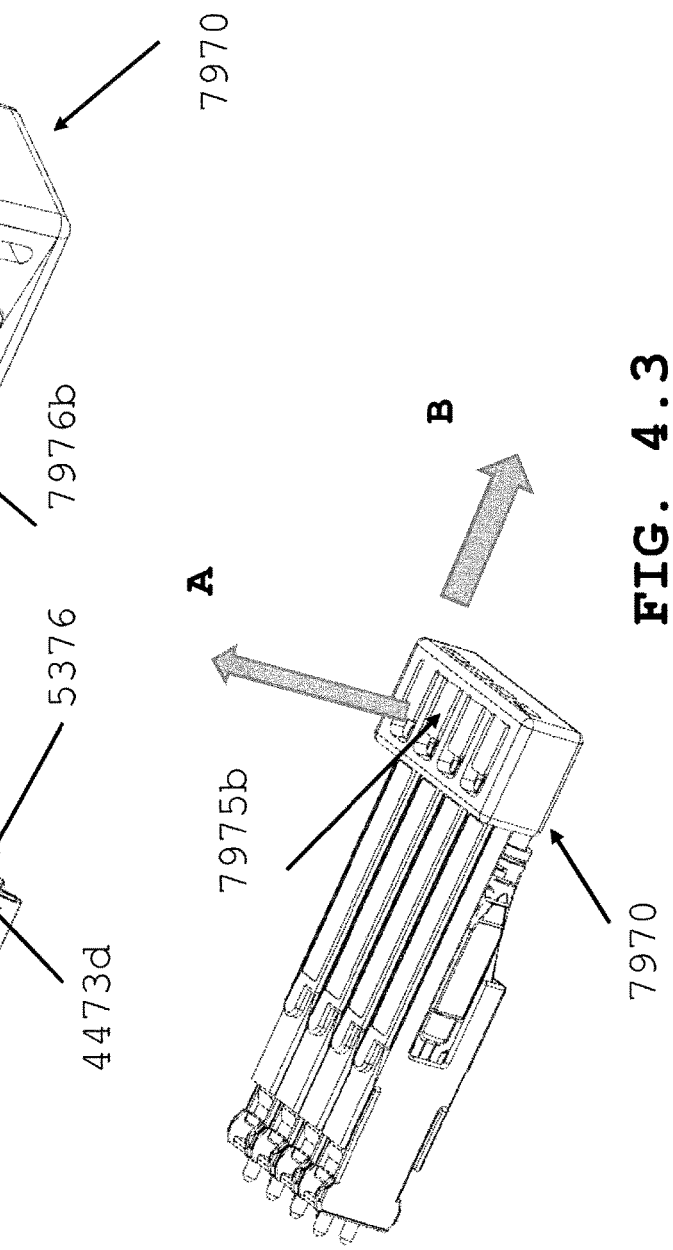

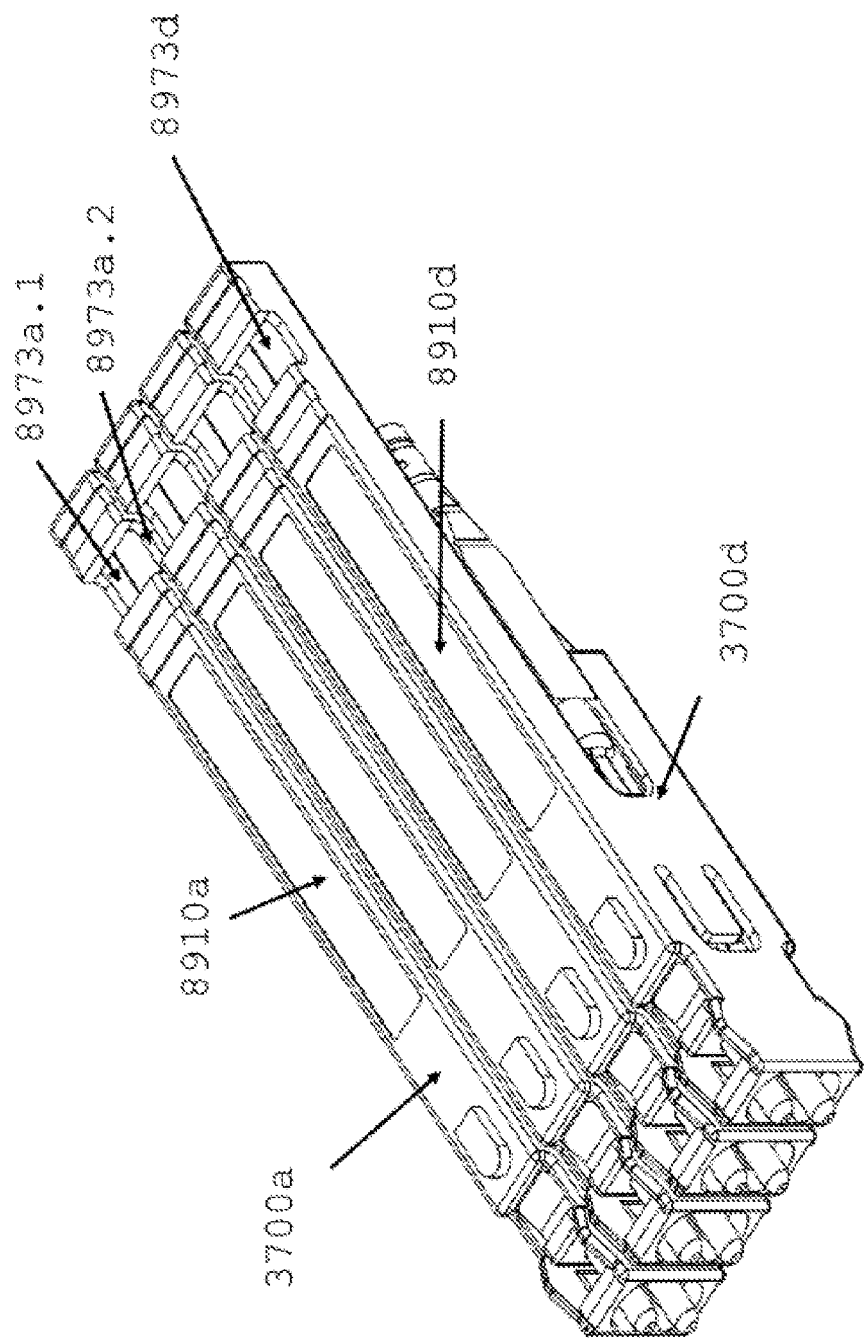

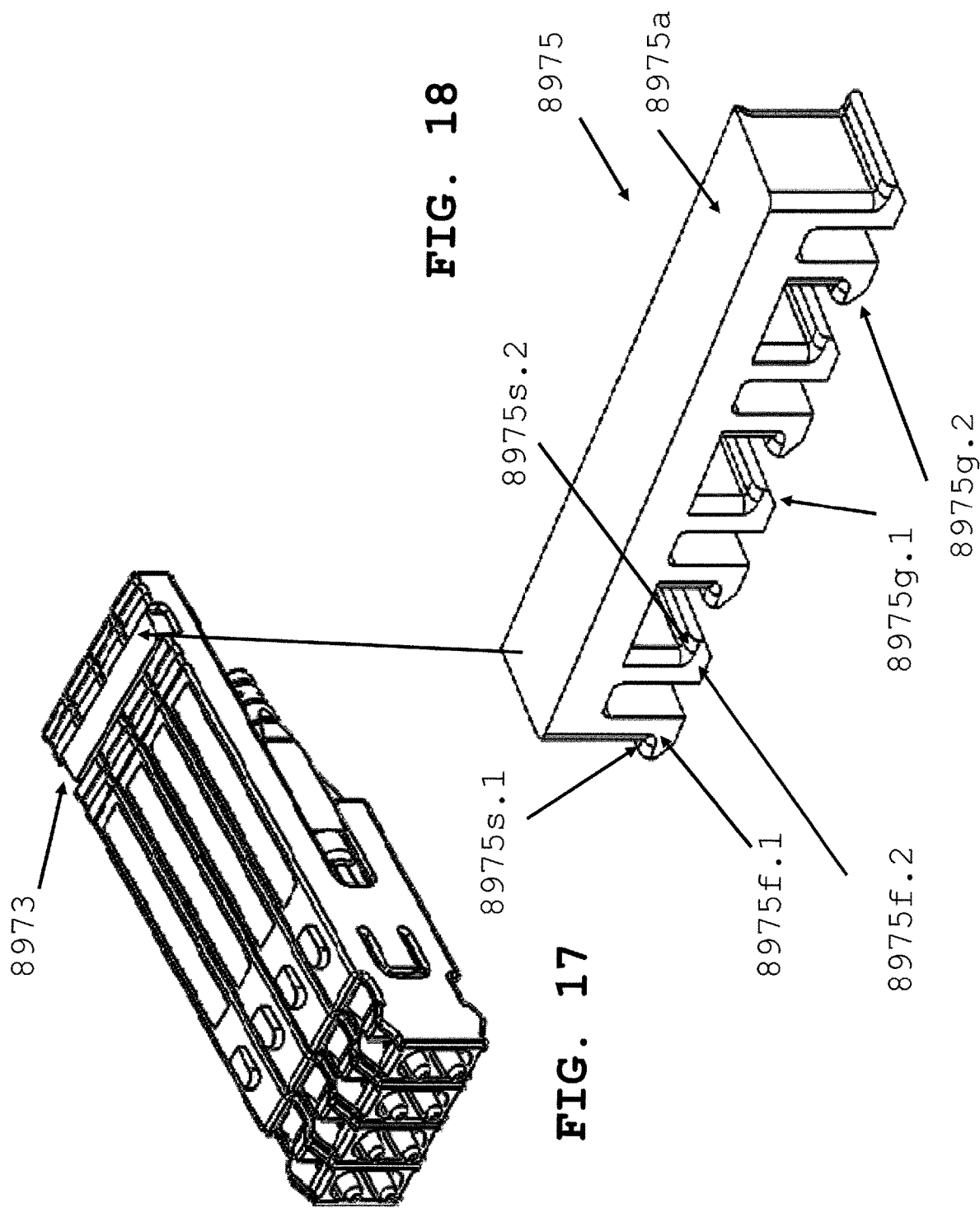

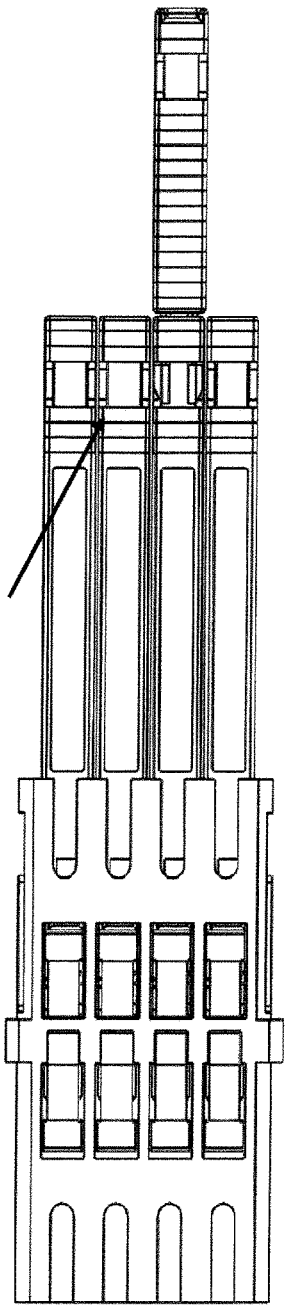
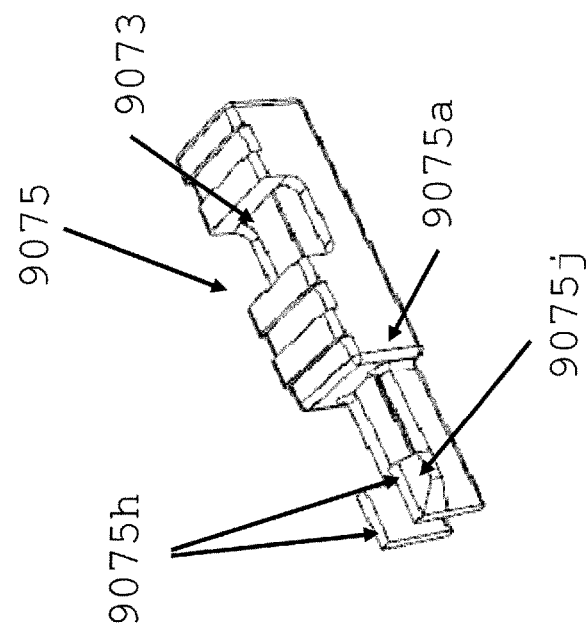
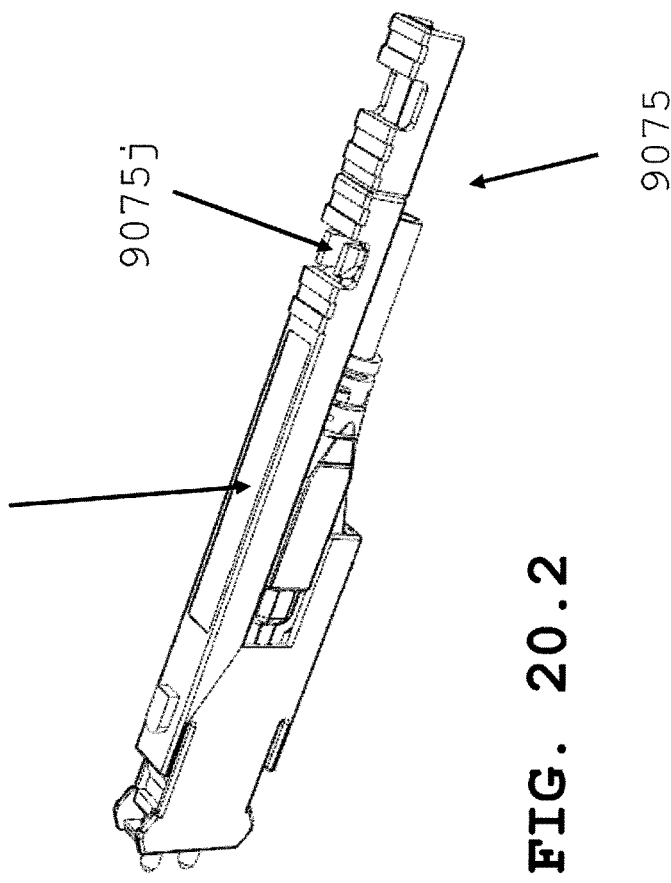
FIG. 20.3
FIG. 20.1
FIG. 20.2

REMOVAL TOOL FOR REMOVING A PLURAL OF MICRO OPTICAL CONNECTORS FROM AN ADAPTER INTERFACE

CROSS REFERENCE TO RELATED APPLICATIONS

The present application claims priority to U.S. provisional application Ser. No. 62/644,776 and filed on Mar. 19, 2018 and titled "Removal Tool for a Plural of Micro Optical Connectors From An Adapter Interface." The provisional application is incorporated into this present non-provisional application.

FIELD OF THE INVENTION

The present disclosure relates generally to ultra-small form factor optical connectors, termed "micro optical connectors," and related connections within adapters and optical transceivers.

BACKGROUND

The prevalence of the Internet has led to unprecedented growth in communication networks. Consumer demand for service and increased competition has caused network providers to continuously find ways to improve quality of service while reducing cost.

Certain solutions have included deployment of high-density interconnect panels. High-density interconnect panels may be designed to consolidate the increasing volume of interconnections necessary to support the fast-growing networks into a compacted form factor, thereby increasing quality of service and decreasing costs such as floor space and support overhead. However, room for improvement in the area of data centers, specifically as it relates to fiber optic connects, still exists. For example, manufacturers of connectors and adapters are always looking to reduce the size of the devices, while increasing ease of deployment, robustness, and modifiability after deployment. In particular, more optical connectors may need to be accommodated in the same footprint previously used for a smaller number of connectors in order to provide backward compatibility with existing data center equipment. For example, one current footprint is known as the small form-factor pluggable transceiver footprint (SFP). This footprint currently accommodates two LC-type ferrule optical connections. However, it may be desirable to accommodate four optical connections (two duplex connections of transmit/receive) within the same footprint. Another current footprint is the quad small form-factor pluggable (QSFP) transceiver footprint. This footprint currently accommodates four LC-type ferrule optical connections. However, it may be desirable to accommodate eight optical connections of LC-type ferrules (four duplex connections of transmit/receive) within the same footprint.

In communication networks, such as data centers and switching networks, numerous interconnections between mating connectors may be compacted into high-density panels. Panel and connector producers may optimize for such high densities by shrinking the connector size and/or the spacing between adjacent connectors on the panel. While both approaches may be effective to increase the panel connector density, shrinking the connector size and/or spacing may also increase the support cost and diminish the quality of service.

In a high-density panel configuration, adjacent connectors and cable assemblies may obstruct access to the individual release mechanisms. Such physical obstructions may impede the ability of an operator to minimize the stresses applied to the cables and the connectors. For example, these stresses may be applied when the user reaches into a dense group of connectors and pushes aside surrounding optical fibers and connectors to access an individual connector release mechanism with his/her thumb and forefinger. Overstressing the cables and connectors may produce latent defects, compromise the integrity and/or reliability of the terminations, and potentially cause serious disruptions to network performance.

While an operator may attempt to use a tool, such as a screwdriver, to reach into a dense group of connectors and activate a release mechanism, adjacent cables and connectors may obstruct the operator's line of sight, making it difficult to guide the tool to the release mechanism without pushing aside the adjacent cables. Moreover, even when the operator has a clear line of sight, guiding the tool to the release mechanism may be a time-consuming process. Thus, using a tool may not be effective at reducing support time and increasing the quality of service.

BRIEF DESCRIPTION OF THE DRAWINGS

FIG. 4.1 is perspective top view of a group of micro connectors similar to FIG. 1 just prior to the insertion of a removal tool shown fully inserted at FIG. 4.3.

FIG. 4.2 is a perspective view of a removal tool according to a second embodiment of the present invention.

FIG. 4.3 is a perspective top view of the removal tool of FIG. 4.2 inserted at a distal end of the group of micro connectors as shown in FIG. 4.1

FIG. 16 is a perspective view of a plural of micro connectors without a removal tool of FIG. 18 attached at a distal end of the connectors.

FIG. 17 is a perspective view of the removal tool of FIG. 18 inserted at a distal end of a group of micro connectors.

FIG. 18 is an isometric view of sixth embodiment of a removal tool.

FIG. 20.1 is a perspective view of seventh embodiment of a removal tool.

FIG. 20.2 is a perspective view of the removal tool of FIG. 20.1 attached to a distal end of a micro connector.

FIG. 20.3 is a perspective view of a group of micro connectors including the removal tool of FIG. 20.1 attached as shown in FIG. 20.2.

DETAILED DESCRIPTION

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise.

The following terms shall have, for the purposes of this application, the respective meanings set forth below.

A connector, as used herein, refers to a device and/or components thereof that connects a first module or cable to a second module or cable. The connector may be configured for fiber optic transmission or electrical signal transmission. The connector may be any suitable type now known or later developed, such as, for example, a ferrule connector (FC), a fiber distributed data interface (FDDI) connector, an LC connector, a mechanical transfer (MT) connector, a square connector (SC) connector, an SC duplex connector, or a straight tip (ST) connector. The connector may generally be defined by a connector housing body. In some embodiments, the housing body may incorporate any or all of the components described herein.

A "fiber optic cable" or an "optical cable" refers to a cable containing one or more optical fibers for conducting optical signals in beams of light. The optical fibers can be constructed from any suitable transparent material, including glass, fiberglass, and plastic. The cable can include a jacket or sheathing material surrounding the optical fibers. In addition, the cable can be connected to a connector on one end or on both ends of the cable.

Various embodiments described herein generally provide a remote release mechanism such that a user can remove cable assembly connectors that are closely spaced together on a high density panel without damaging surrounding connectors, accidentally disconnecting surrounding connectors, disrupting transmissions through surrounding connectors, and/or the like. Various embodiments also provide narrow pitch LC duplex connectors and narrow width multi-fiber connectors, for use, for example, with future narrow pitch LC SFPs and future narrow width SFPs. The remote release mechanisms allow use of the narrow pitch LC duplex connectors and narrow width multi-fiber connectors in dense arrays of narrow pitch LC SFPs and narrow width multi-fiber SFPs.

Figure 1:
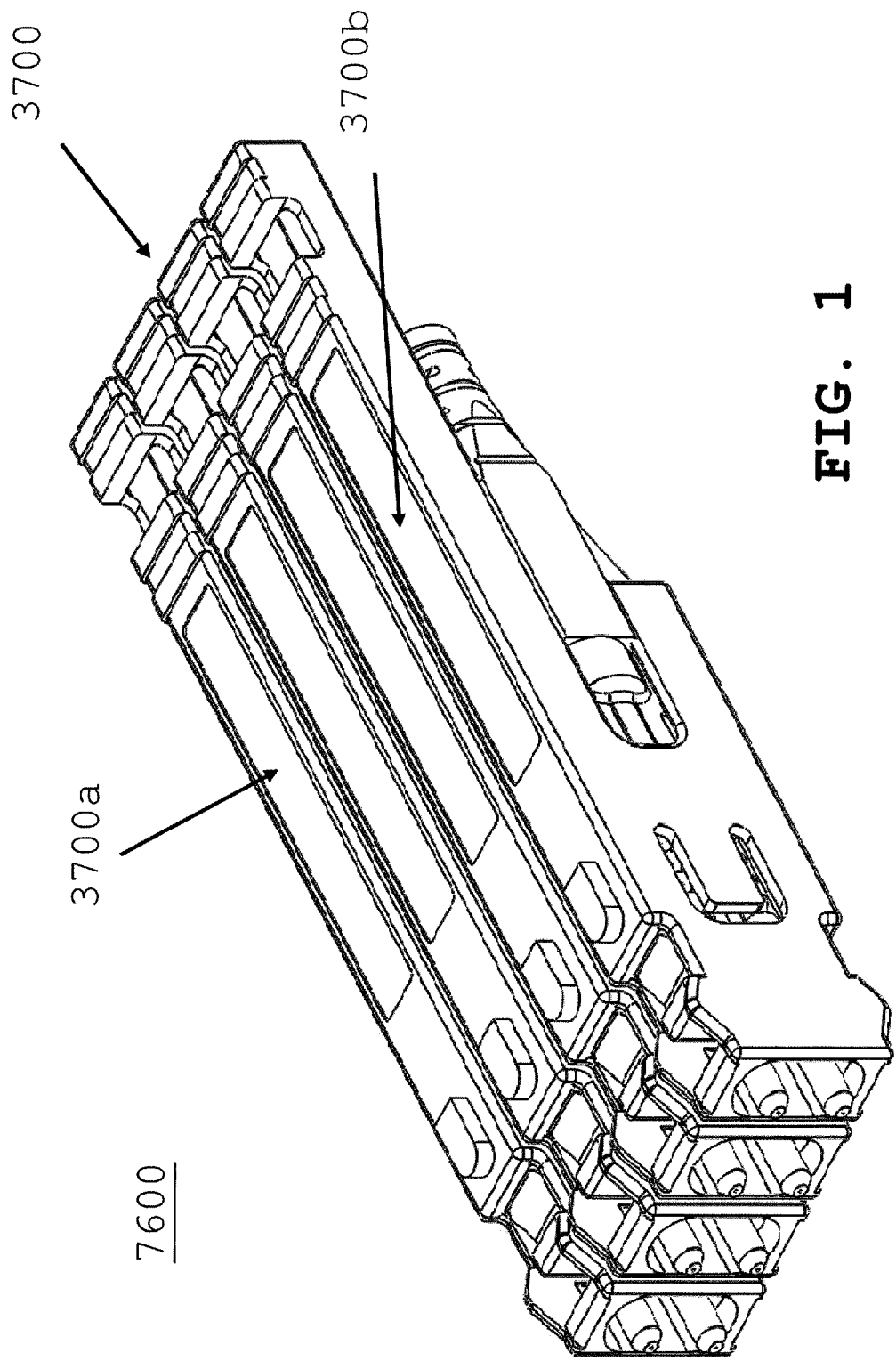
FIG. 1 is a perspective top view of a group of micro connectors with a push/pull tab similar to the micro connector of FIG. 2.
Figure 2:
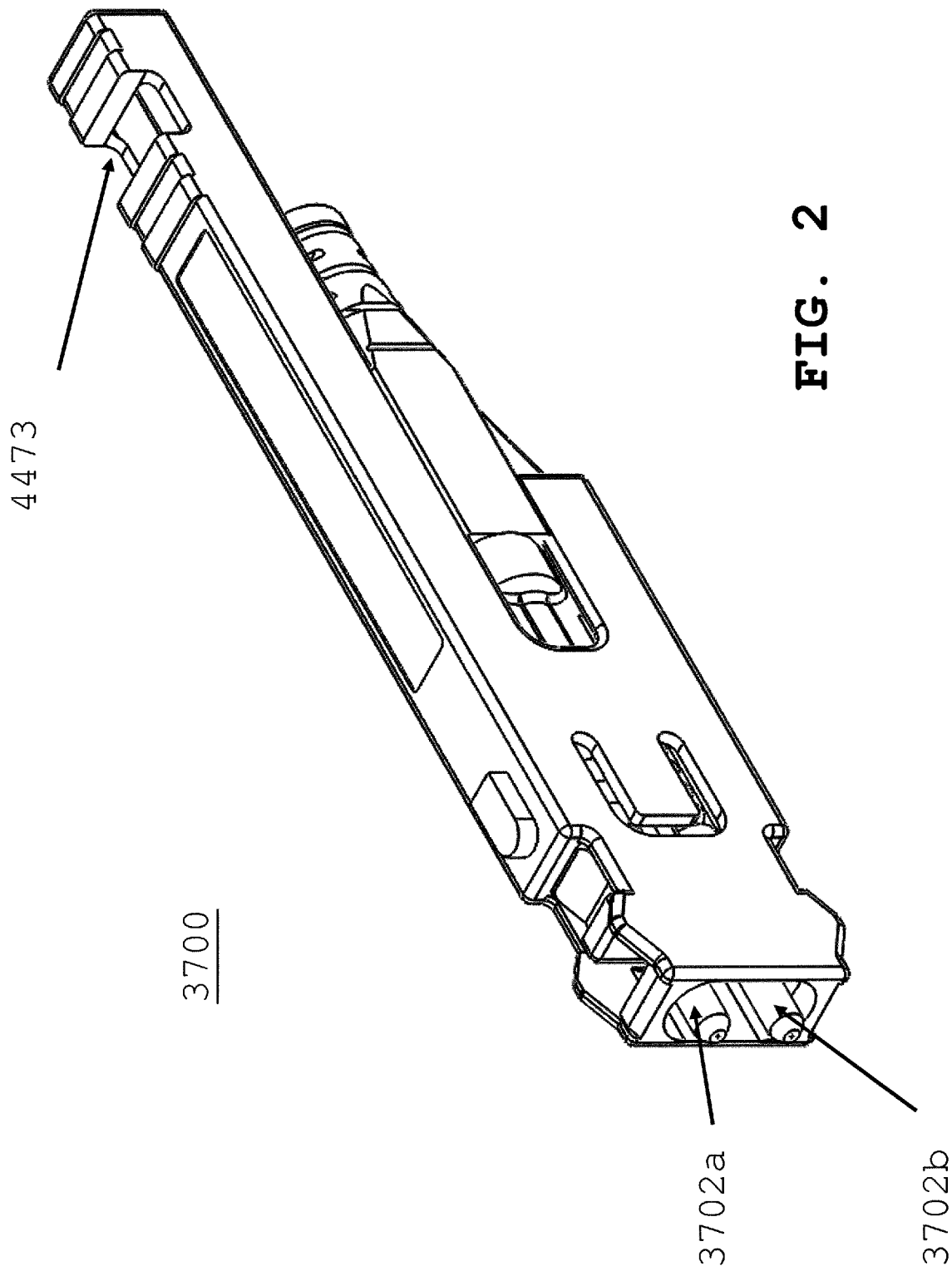
FIG. 2 is a perspective view of a micro connector according to the present invention.

FIG. 1 show a plural 7600 of micro connectors 3700 prior to insertion into an adapter (not shown). FIG. 2 shows a single micro connector 3700 configured to accept a removal tool at release recess 4473. Fiber optic ferrules (3702a, 3702b) defined a proximal end of micro connector 3700. Adapter latch hook flexes into recess 3702c during insertion of micro connector 3700 into an adapter receptacle (not shown). Applicant pending patent application U.S. Pat. No. 20190018209A1 "Ultra-Small Form Factor Optical Connectors", Inventor Takano, discloses adapter and micro connector latching such as at FIG. 23A.

Figure 3:
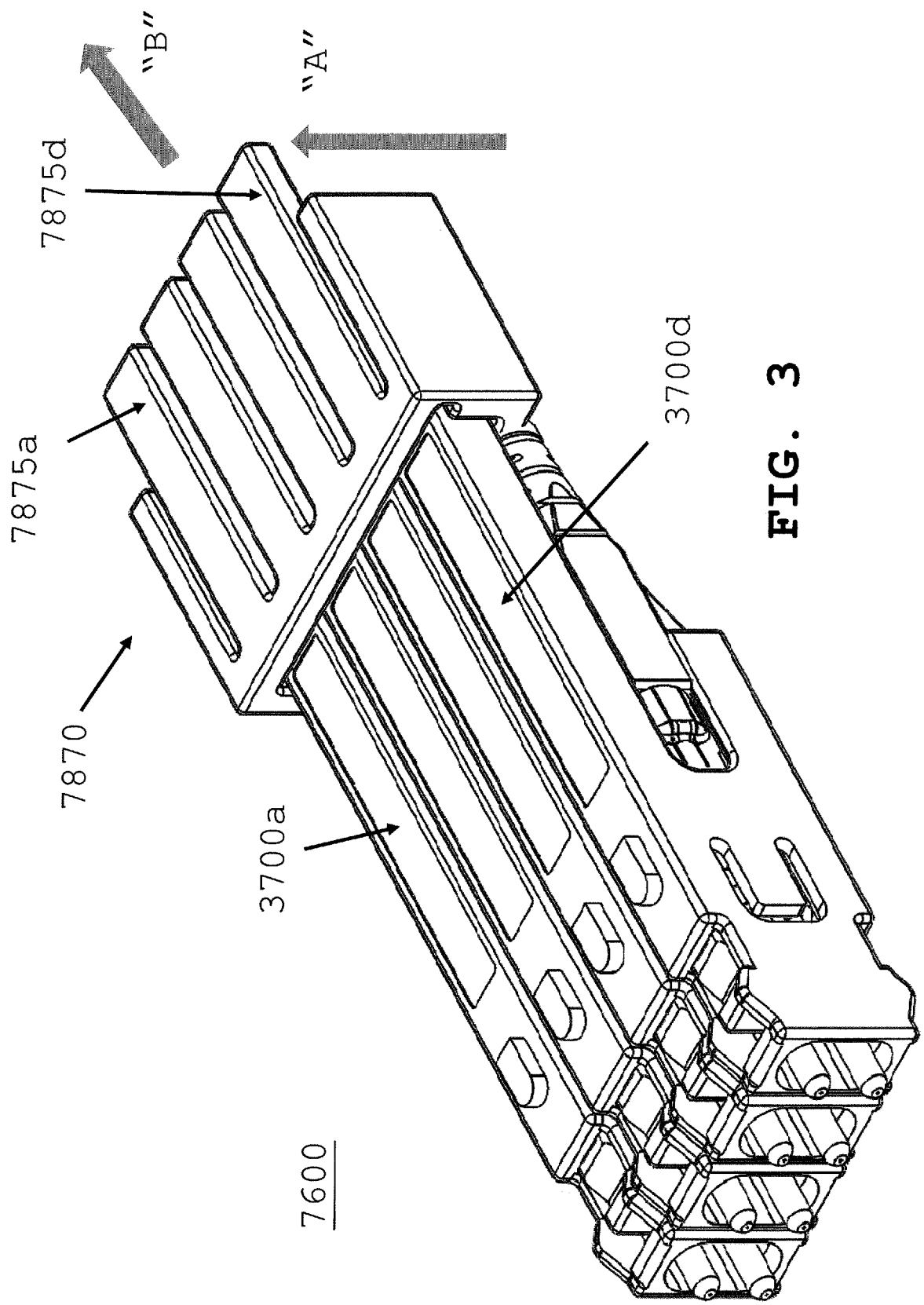
FIG. 3 is a perspective view of a group of micro connectors of FIG. 1 with a removal tool attached at a distal end of the micro connectors pull/push tab.

FIG. 3 depicts a first embodiment of removal tool 7870 attached to a distal end of a plural of micro connector 3700a-3700d forming a removal tool assembly 7600. Removal tool 7870 further comprises a plural of release arms 7875a-7875d for each micro connector (3700, 5300) group together. In operation, a user would pull up in the direction of arrow "A" a release arm 7875, then pull in direction of arrow "B" to remove one or more micro connector for which the arm is not activated or pulled up.

Referring to FIGS. 4.1 to 4.3, a second embodiment of removal tool 7970 is shown. Referring to FIG. 4.1, tool 7970 further comprises guide block 7976 that is configured to engage and be inserted into a corresponding opening 5376 located at a distal end of a push/pull tab 5310 of micro connector 5300, located at FIG. 4.1. Connector 5300a further comprises push/pull tab release 5310a. Connector 5300b comprises push/pull tab 5310b. Connector 5300c comprises push/pull tab 5310c.

Referring to FIG. 4.2, removal tool 7970 contains a plural of release arms 7975 in operation that get pulled up when removing the tool, as described below. Pulling up on one or more release arms prior to displacing the tool in the distal direction, the corresponding micro connector is retained or not removed from its corresponding adapter receptacle. FIG. 20.3 depicts a plural of micro connectors secured within an adapter receptacle. FIG. 4.1 depicts a release recess 4473 for each micro connector. For example, release recess 4473 is for micro connector 5300a. Referring to FIG. 4.1 and FIG. 4.2, removal tool 7975 inserted at the distal end of a plural of micro connector 5300 is as shown in the direction of arrow "C".

Referring to FIG. 4.3, upon insertion each release arm 7975a-7975d engages a release recess 4473a-4473d (refer to FIG. 4.1), and upon removing the tool in the direction of arrow "B" all micro connectors would be removed from an adapter (not shown). Pulling up one or more release arms 7975 (also shown in FIG. 4.2 7975a-7975d)) in the direction of arrow "A" and removing the tool in the direction of arrow "B", the micro connectors corresponding to the pulled up release arm, those micro connectors would remain in its corresponding adapter receptacle (not shown).

Figure 5:
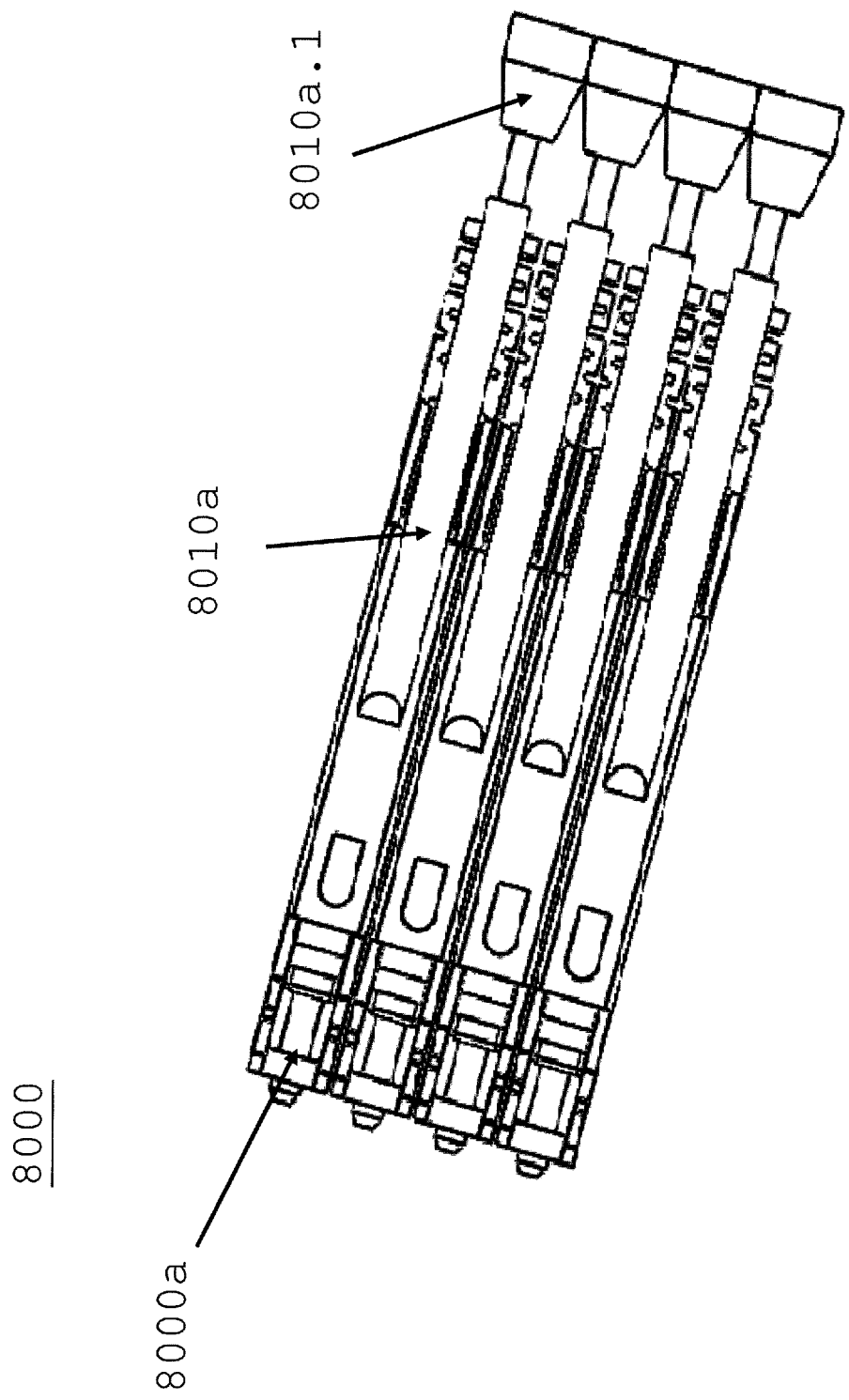
FIG. 5 is a top perspective view of a group of micro connectors with an alternative push/pull tab configured to accept the removal tool of FIG. 4.2.

Referring to FIG. 5, a plural of micro connectors 8000 with an alternative pull/push tab release 8010. Push/pull release 8010a comprises handle 8010a.1 at the distal end of the micro connector 8000a. Release tool 7970 can be configured to accept a second handle type 8010a.1 without departing from the scope of the invention.

Figure 6:
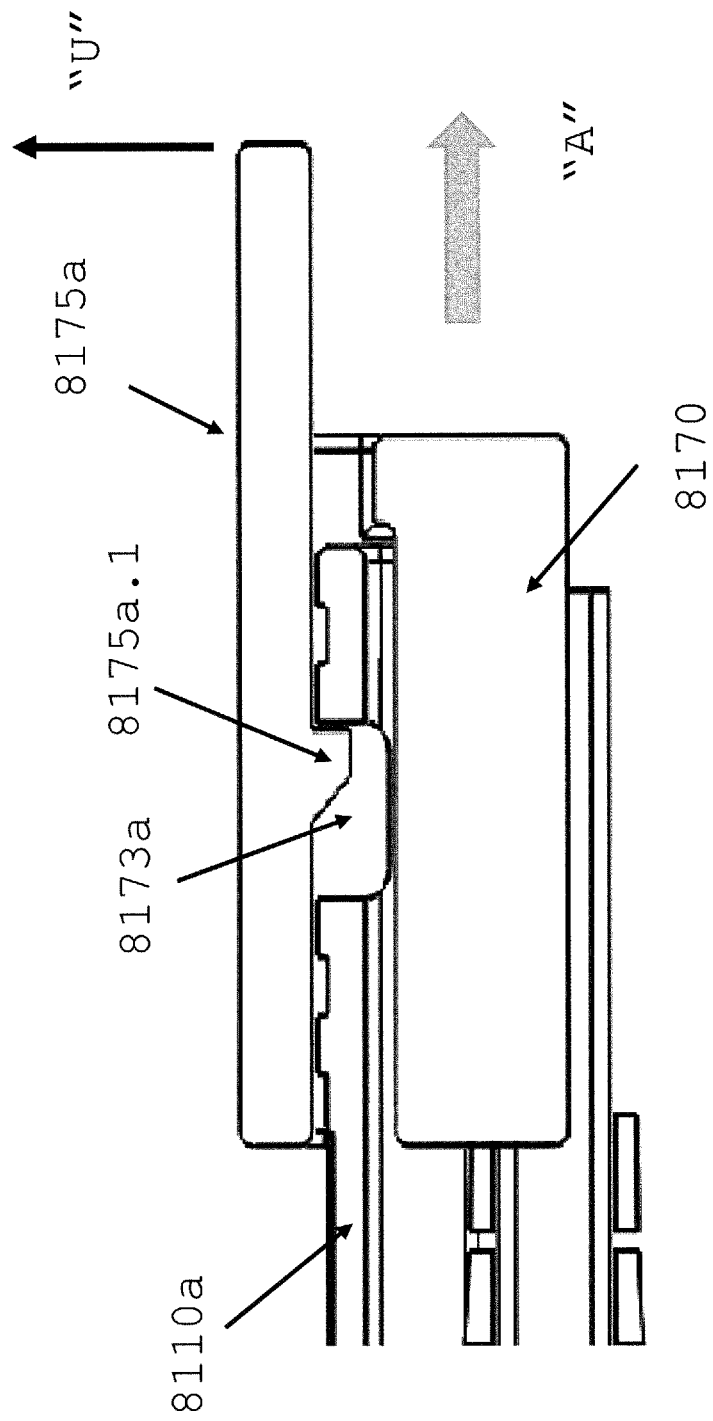
FIG. 6 is a cut away view of the removal tool of FIG. 3 inserted at a distal end of a push/pull tab of a micro connector.

Referring to FIG. 6, removal tool 8170 is shown locked onto a distal end of a push/pull release 8110a, forming removal tool assembly 8100, when release arm 8175a protrusion 8175a.1 engages an opening or recess 8173a in push/pull tab release 8110a. Pulling release arm rearward in this FIG. 6 in the direction of arrow "A", the micro connector is removed from its corresponding adapter receptacle.

Referring to FIG. 6, to disengage the lock formed between the protrusion 8175a.1 and recess 8173a, release arm 8175a is lifted up in direction of "U". Then when removal tool 8170 is pulled rearward, in the direction of arrow "A", the micro connector (3700 or 5300) is not removed from an adapter (not shown). That is protrusion 8175a.1 is removed from recess 8173a, and upon a distal or rearward pull of removal tool 8170, micro connector (3700a, 5300a or 8100a) is retained in adapter receptacle (not shown) by an adapter latch (not shown) within micro connector recess at a proximal end of the micro connector. This securing of micro connector into adapter via a latch is well known in the art.

Figure 7:
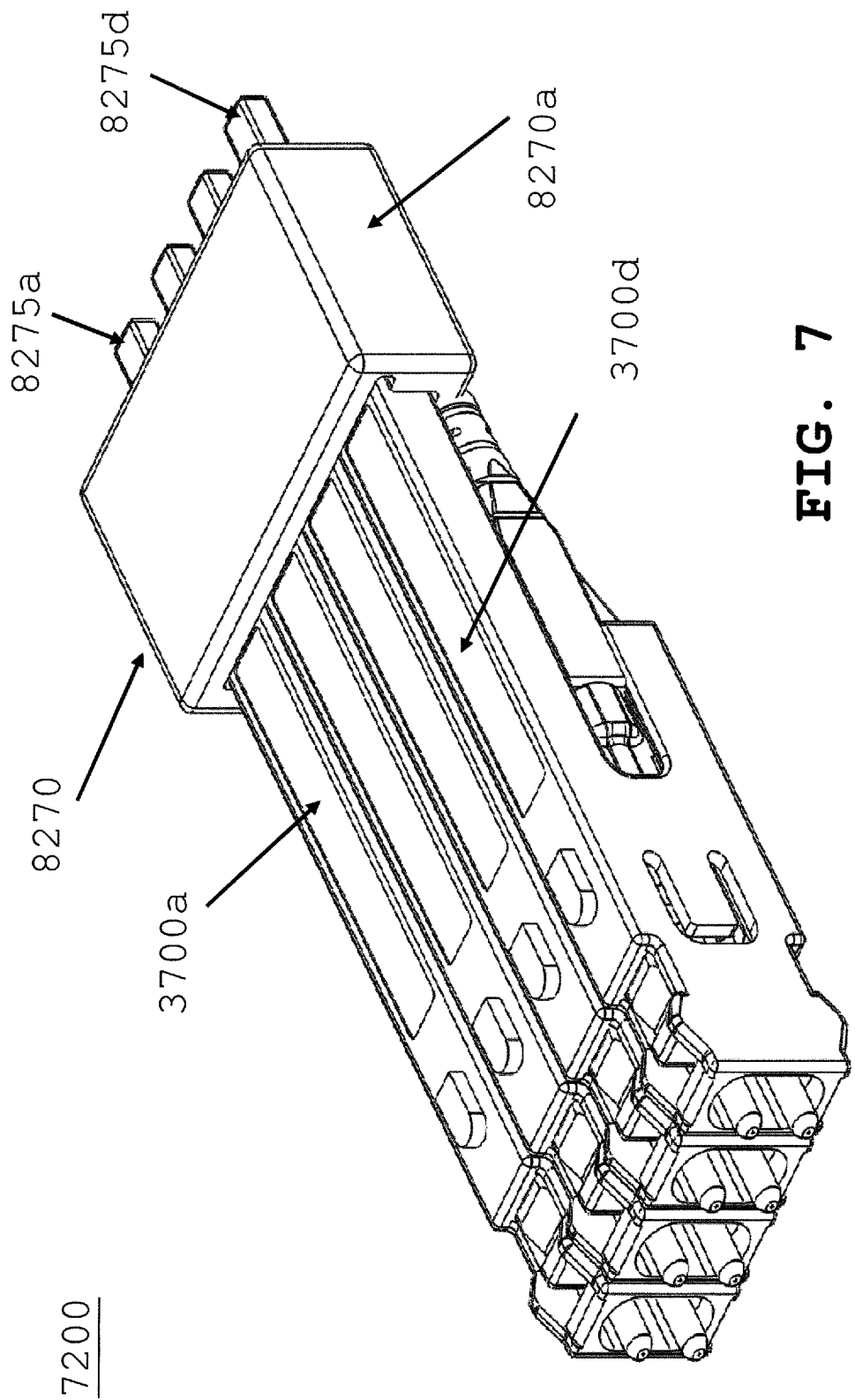
FIG. 7 is an isometric view of a third embodiment of a removal tool attached at distal end of a push/pull tab of a group of micro connectors.

FIG. 7 depicts a third embodiment 7200 of removal tool 8270 connected at a distal end of a plural of micro connector 3700a-3700d. Removal tool 8270 further comprises release arms 8275a-8275d, one release arm for each micro connector ganged together within the housing 8270a of removal tool 8270.

Figure 8:
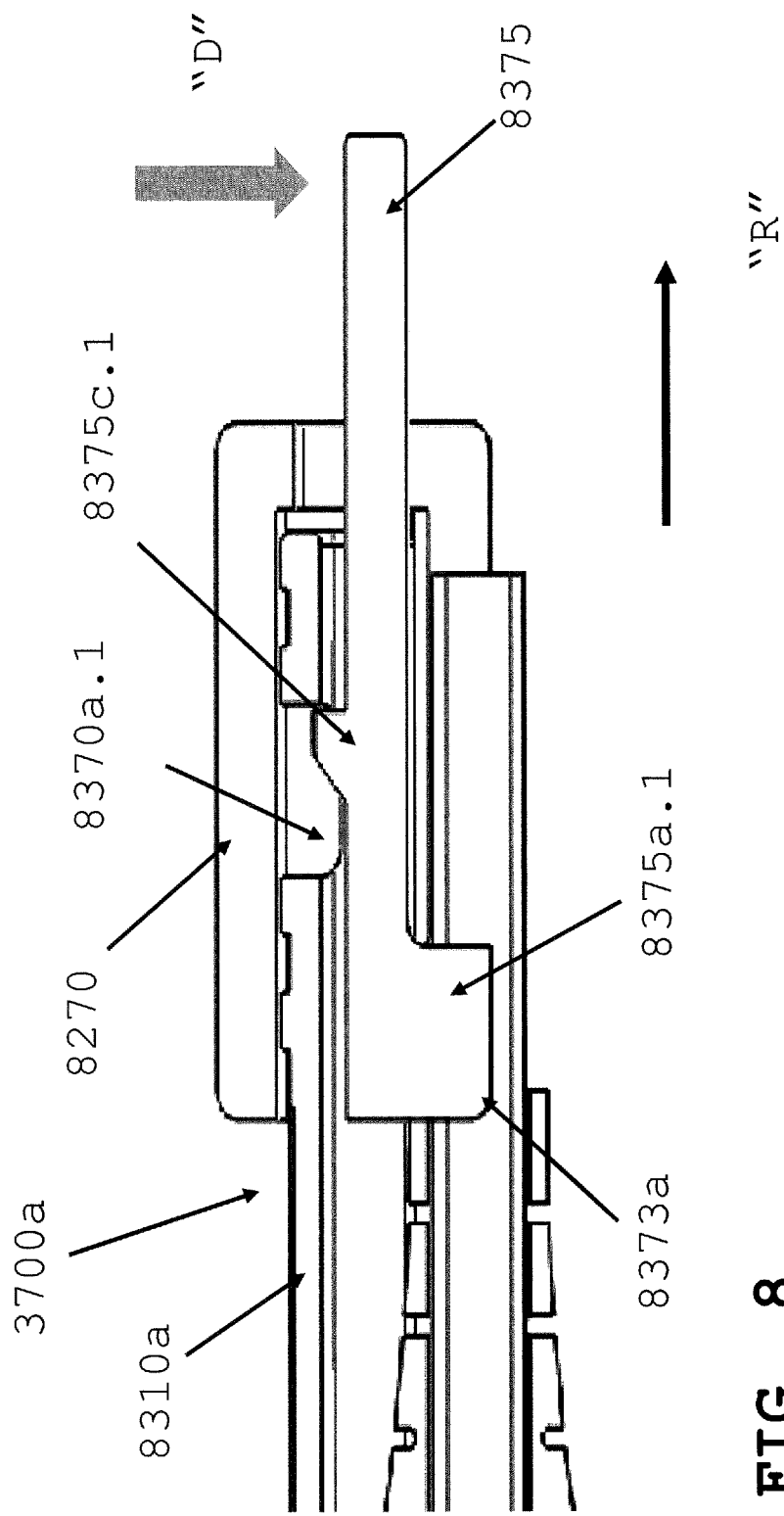
FIG. 8 is a cross-section view of the removal tool of FIG. 7.

FIG. 8 depicts a cross-section view of micro connector 3700a, as shown in removal tool assembly 7200, which is a plural of micro connectors ganged or grouped together with removal tool 8270. At FIG. 8, removal tool 8270 is shown in a locked position at the distal end of micro connector 3700 or 5300. FIG. 8 is the cross-section of the third embodiment of removal tool 8270. In FIG. 6, locking arm protrusion is deflected in the upward direction "U" and in FIG. 8, release arm locking protrusion 8375c.1 is deflect downward of "D" direction. In both cases, release arm unlocks and the micro connector is not removed from its adapter receptacle when the removal tool is displaced distally Referring to FIG. 8, removal tool 8270 further comprises release arm 8375 at a first end, recess locking protrusion 8375a.1 at a second end and a release arm locking protrusion 8375c.1 along a first or second side of its corresponding release arm. Recess locking protrusion 8375a.1 engages a corresponding opening or recess 8373a located at a distal end of the push/pull tab on connector 3700a to lock micro connector 3700 within removal tool 8270 housing. Removal tool 8270 housing further comprises recess 8370a.1 configured to accept release arm locking protrusion 8375c.1. Upon insertion of removal tool 8270 onto the distal end of the plural of micro connectors (3700, 5300) as depicting at removal tool assembly 7200, removal tool 8270 locks via release arm protrusion 8375c.1 into opening 8370a.1 and release locking protrusion 8375a.1 in recess 8373a (also shown at FIG. 4.1 as recess 4473). When depressing the corresponding connector release arm 8375 in the direction of the arrow "D", locking protrusion 8375c.1 is moved out of recess 8370a.1, and removal tool 8270 is pulled rearward or in direction of arrow "R". When a release arm is depressed, "D", its corresponding micro connector is retained in an adapter (not shown), while the remaining micro connectors of the plural of micro connectors are removed from an adapter receptacle (not shown) upon moving removal tool 8270 in the direction of arrow "R". FIG. 8 depicts release arm 8375 in locked position that upon displacing removal tool distally, the corresponding micro connector, in-line with release arm 8375, is removed from its adapter receptacle.

Figure 9:
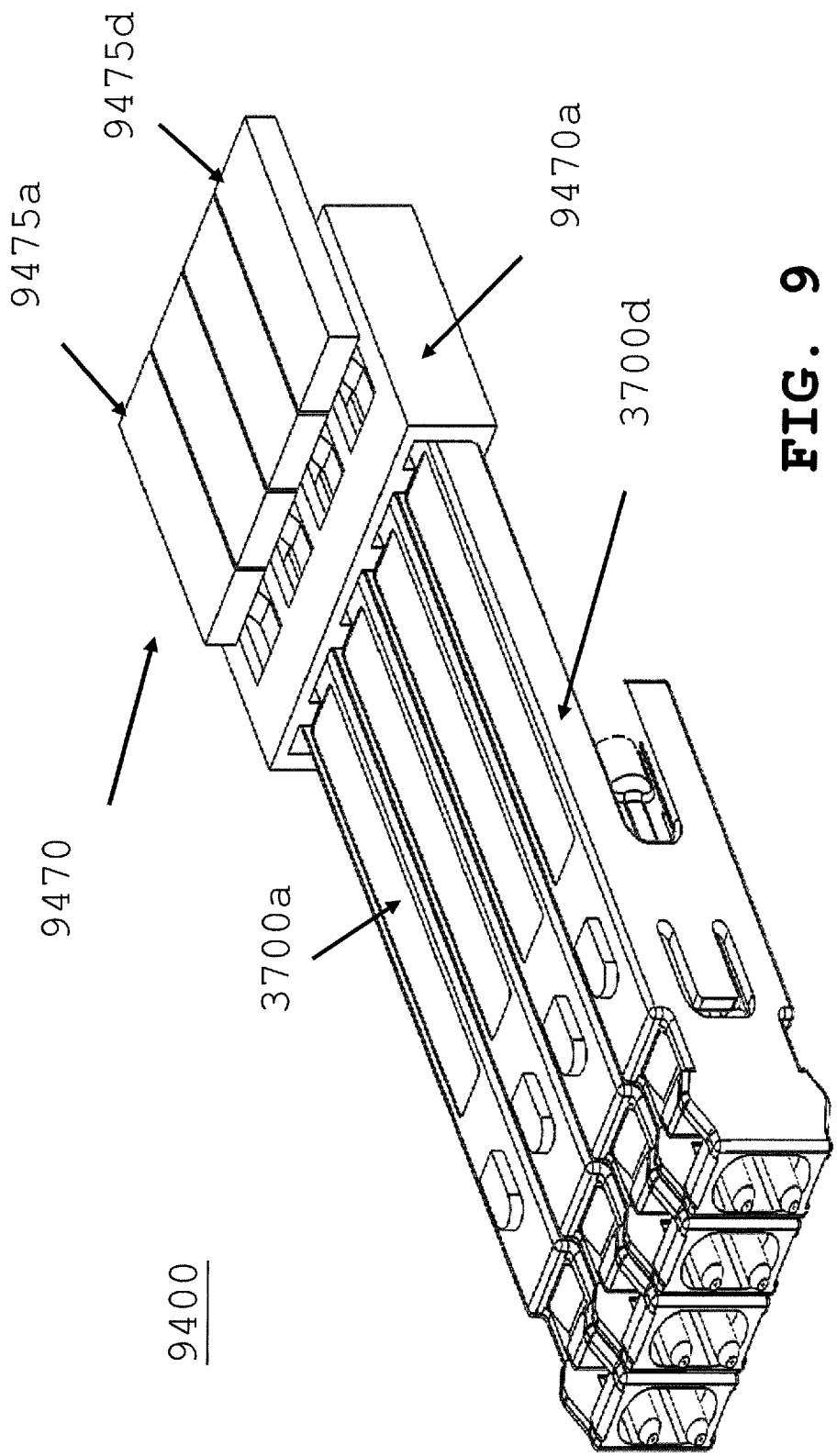
FIG. 9 is an isometric perspective view of fourth embodiment of a removal tool attached to a distal end of a push/pull tab of a group of micro connectors.

FIG. 9 depicts a fourth embodiment of a removal tool 9470 securing a plural micro connectors 3700a-d, housing 9470a further gangs or groups release arms 9475a-9475d corresponding to the number of micro connectors 3700a-3700d secured within the removal tool housing 9470a. It is understood the plural of micro connectors can be micro connector 3700, 5300 or 8000 without departing from the scope of the invention. FIG. 9 is in an unlocked position. Displacing removal tool 9470a distally (or an individual release arm distally), none of the micro connectors are removed from their corresponding adapter receptacle.

Figure 10:
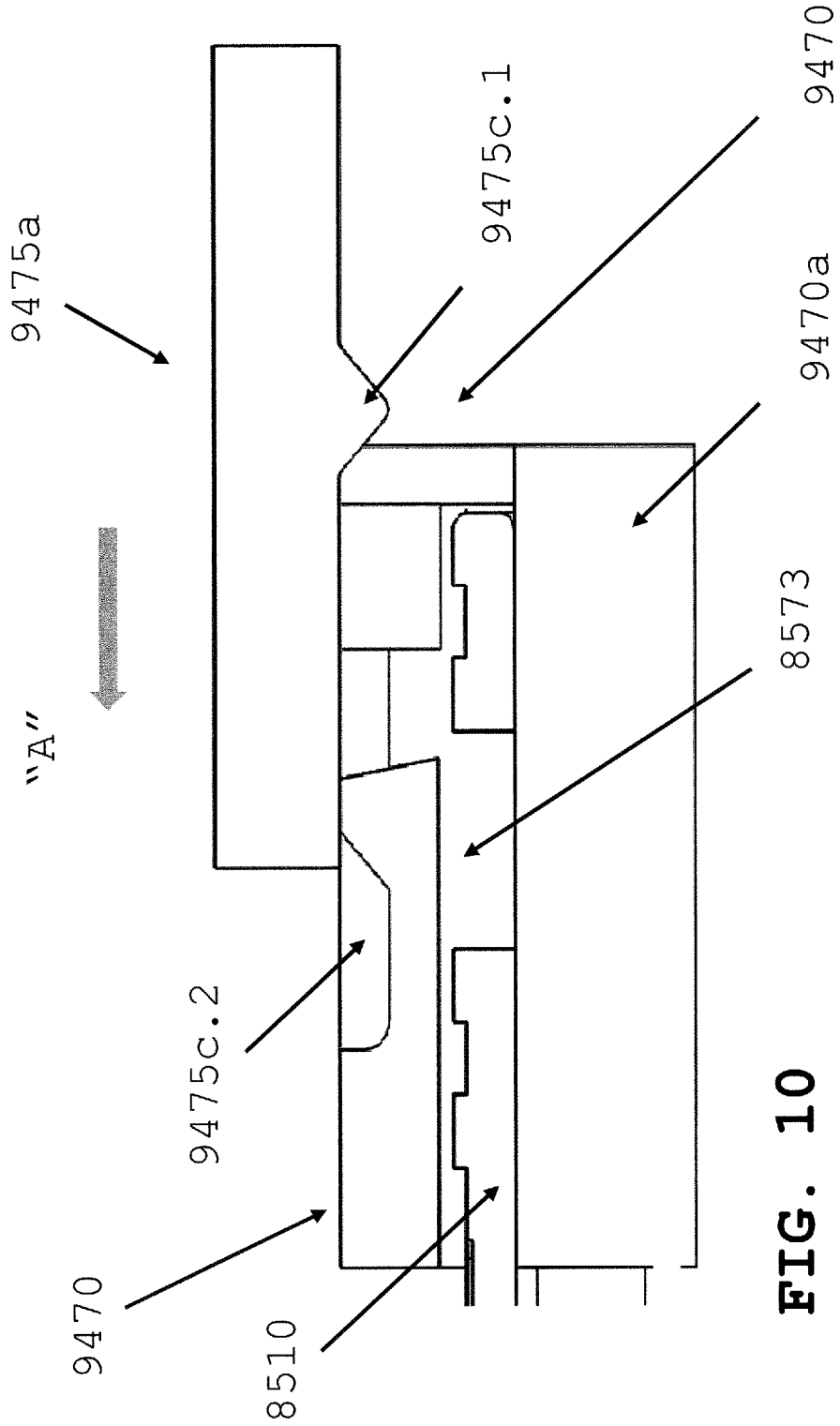
FIG. 10 is a cross-section view of the removal tool of FIG. 9, the removal tool is in an unlocked position attached to a distal end of a push/pull tab of a micro connector of the present invention.
Figure 11:
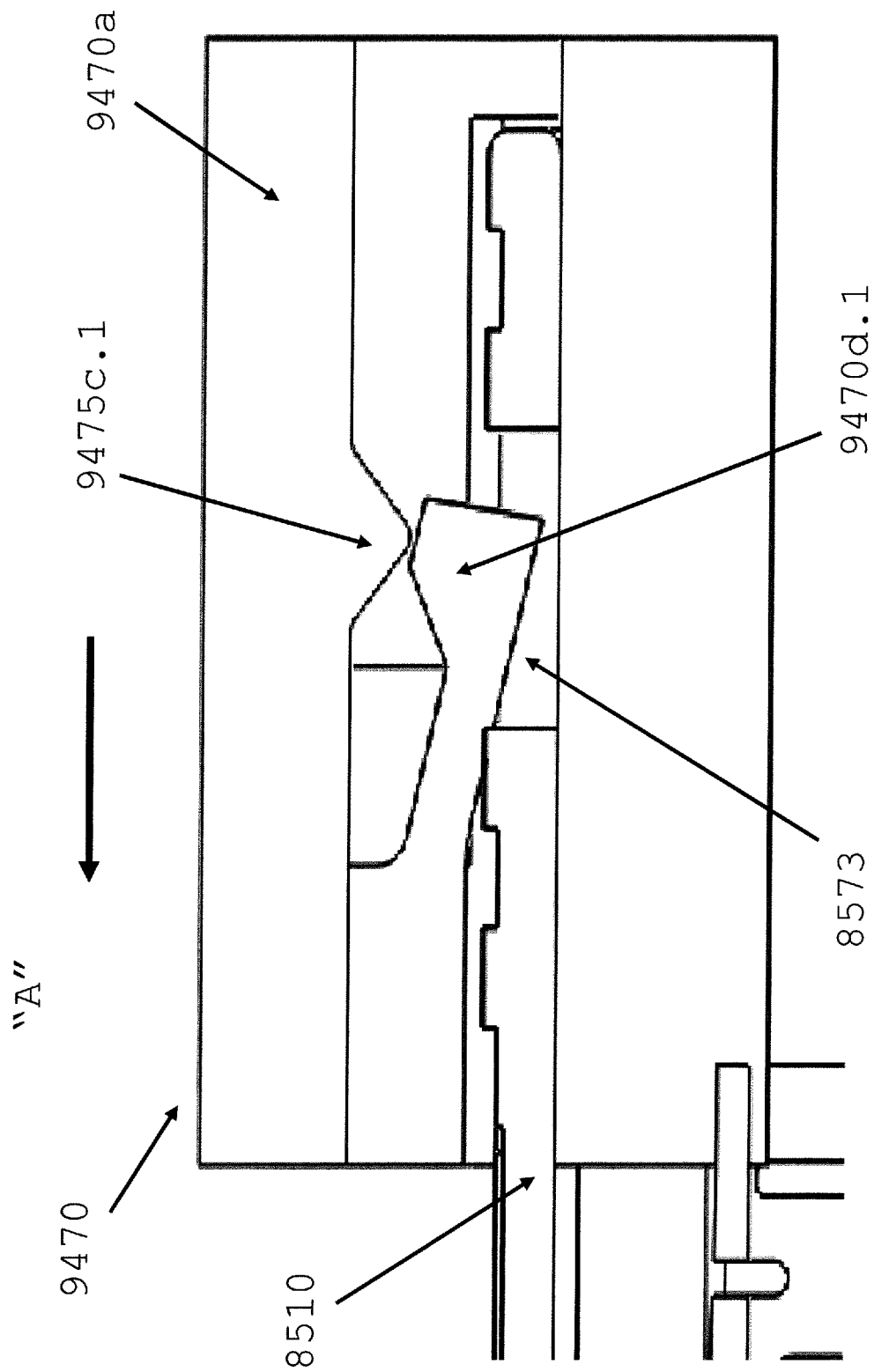
FIG. 11 is a cross-section view of the removal tool of FIG. 9 in a locked position attached to a distal end of a push/pull tab of a micro connector for removal thereof according to the present invention.

Referring to FIGS. 10 to 11, the operation of removal tool 9470 is disclosed. In FIG. 10, release arm 9475a is in an unlocked position with its corresponding release arm locking protrusion 9475c.1 disengaged from a corresponding flexible latch 9470d.1 (refer to FIG. 11) formed as part of removal tool 9470. Displacing removal tool 9470 in a distal direction, the micro connector is retained in its adapter receptacle.

Referring to FIG. 11, release arm 9475a (in a locked position) is moved to a proximal end or in the direction of arrow "A" (refer to FIG. 10). As removal tool is moved proximally, release arm locking protrusion 9475c.1 engages flexible latch 9470d.1 integrated as part of housing 9470a of removal tool 9470. Flexible latch 9470d.1 is displaced into recess 8573 located at a distal end of pull/push tab release 8510 attached to micro connector 5300 or 3700. FIG. 11 depicts a locked position of removal tool 9470. Pulling removal tool 9475 distally or pulling it rearward, one or more micro connectors are removed or unlatched from an adapter (not shown). Referring to FIG. 10, the release arm is in an unlocked position, and upon removing tool 9470, the one or more micro connectors are not removed or remain latched in an adapter (not shown) in the unlocked position of release arm 9475a (FIG. 10).

Without departing from the scope of the invention, one or more micro connectors of a plural of micro connectors, with any of the removal tools, the release arm may be positioned in an unlocked or locked configuration, and upon pulling the removal tool rearward, the corresponding micro connector that corresponds to a release arm is not removed or removed from an adapter.

Figure 12:
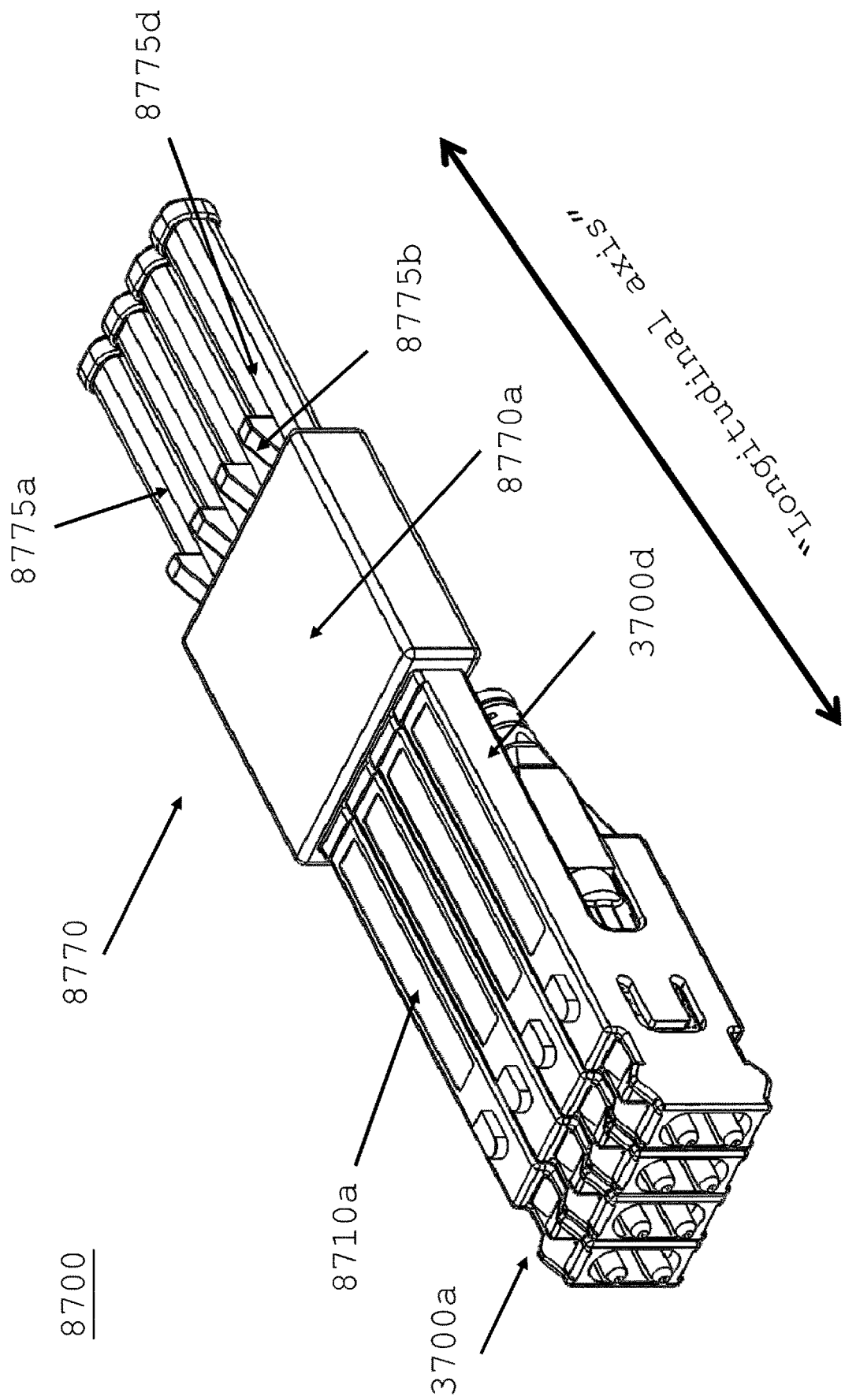
FIG. 12 is an isometric view of fifth embodiment of a removal tool attached to a distal end of a push/pull tab of a group of micro connectors.

Referring to FIGS. 12-15, a fifth embodiment of a removal tool to remove one or more micro connectors from an adapter (not shown) is disclosed. FIG. 12 depicts a fully assembled plural of micro connectors 3700 secured within removal tool 8770 housing 8770a, as removal tool assembly 8700. A plural of release arms 8775a-8775d each with a release arm protrusion 8775b is depicted in assembly 8700. Still referring to FIG. 12, plural of micro connectors 3700 or micro connectors 5300, without departing from the scope of the invention, have attached at the distal end of pull/push tab 8710 removal tool 8770. Removal tool 8770 further comprises housing 8770a, one or more release arms 8775a-8775d, and each release arm further comprises one or more release arm locking protrusion 8775b.

Referring to FIG. 12, each release arm 8775a-8775d corresponds to micro connector 3700a-3700d more specifically the removal tool is configured to attach to and integrate with pull/push tab 8710 of its corresponding micro connector 3700. Each release arm 8775a-8775d operates independent of the other to retain or remove its corresponding micro connector from an adapter receptacle. This release action occurs upon the distal movement of the removal tool. In operation, each release arm 8775a-8775d is placed in a locked or unlocked position relative to its corresponding micro connector. FIG. 12 depicts all release arms in a locked position. In a locked position of a release arm, upon a distal movement of removal tool, the corresponding micro connector to the locked release arm, this corresponding micro connector is removed from its corresponding adapter receptacle. Distal movement is away from the proximal end of the micro connector. The proximal end of the micro connector is defined as the end with fiber ferrules showing.

Figure 13:
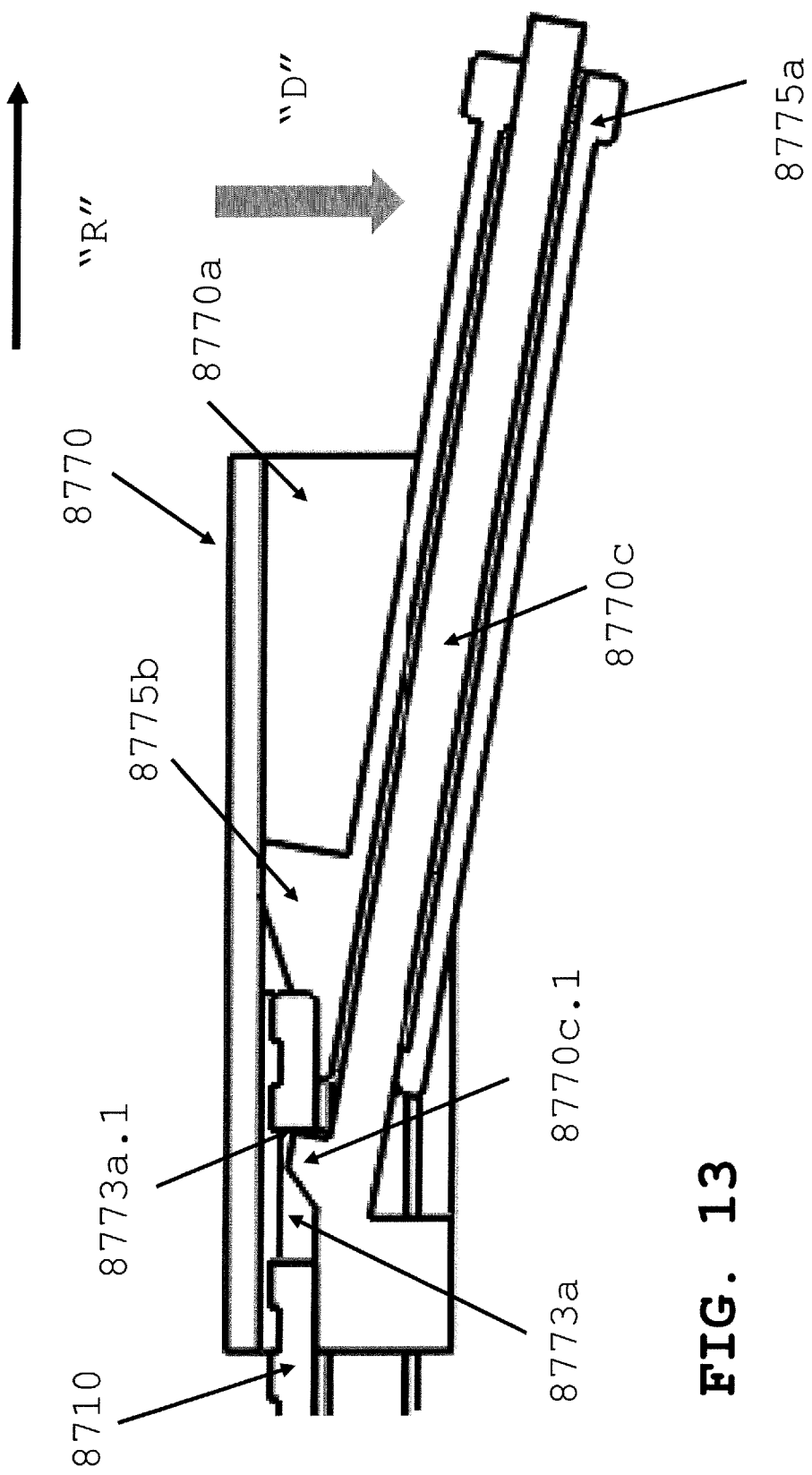
FIG. 13 is a cross-section of the removal tool just prior to an unlocked position to unlock a micro connector with the removal tool of FIG. 12.

FIG. 13 depicts removal tool release arm 8775*a*, of FIG. 12, pushed in toward the proximal end of the micro connector and then down in direction of arrow "D" to arm release unlocking position. This will result in the corresponding micro connector not being removed from its adapter receptacle. Unlocking is relative the micro connector secured within an adapter. The locked and unlocked position is relative to the adapter receptacle. In locked position (refer to FIG. 14), and moving the removal tool distally, a micro connector is removed. FIG. 13 depicts retaining the micro connector within its adapter receptacle. The micro connector retained or released is the micro connector corresponding to the release arm on the longitudinal axis of the micro connector, as depicted in FIG. 12.

Referring to FIG. 13, as release arm 8775*a* is being depressed downward in "D". Once fully depressed, release arm locking protrusion 8770*c*.1 moves out of recess 8773*a* or beyond wall 8773*a*.1, which allows the release arm 8775*a* secured within the removal tool housing, to be pulled rearward. Upon rearward movement, in direction of arrow "R", of removal tool 8770, the micro connector corresponding to its release arm, this micro connector is not removed from an adapter (not shown), or the micro connector is retained in its adapter receptacle or locked therein.

Figure 14:
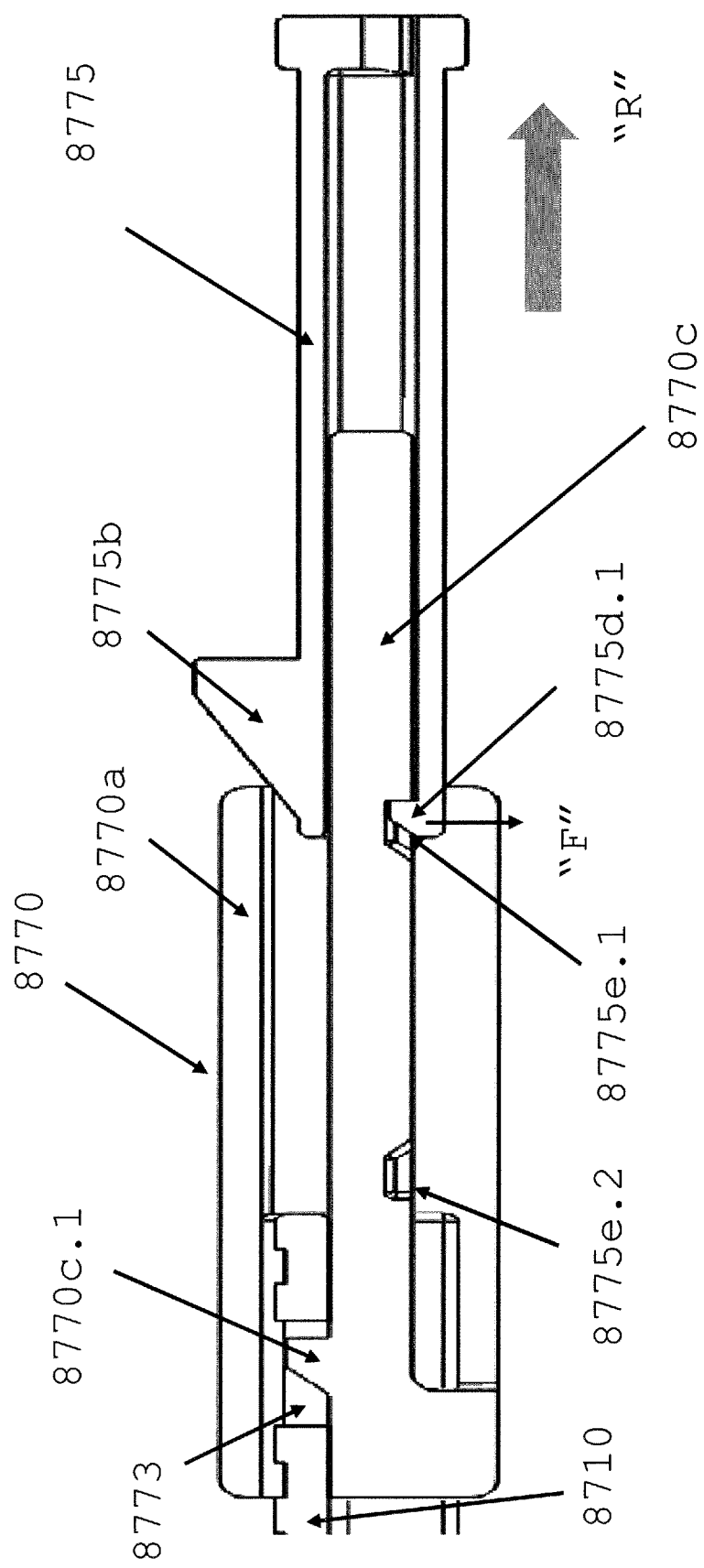
FIG. 14 is a cross-section of the removal tool locking a micro connector using the removal tool of FIG. 12.

FIG. 14 depicts release arm 8775 in a locked position at a distal end of the pull/push tab 8710 of corresponding micro connector 3700. In a locked position, upon pulling release arm 8775 rearward or in the arrow direction "R", because release arm 8775 is secured within a first recess 8775*e*.1 at a distal end of its corresponding micro connector via release arm latch 8775*d*.1, the removal in direction of "R" will remove the micro connector from an adapter (not shown). Locking arm 8770*c* protrusion 8770*c*.1 is retained within recess 8773 during the movement in direction of "R", thereby releasing micro connector from adapter receptacle. Locking arm 8770*c* is interconnected with release arm 8775 via latch 8775*d*.1. Removal tool housing 8770*a* further comprises a separate release arm 8775, a first locking recess 8775*e*.1 and a second locking recess 8775*e*.2, and release arm latch 8775*d*.1. Release arm latch 8775*d*.1 moves from first locking recess 8775*e*.1 to a second locking recess 8775*e*.2. The operation of release arm latch 8775*d*.1 and locking recesses (8775*e*.1, 8775*e*.2) retain release arm 8775 in a locked (refer to FIG. 14) or unlocked (refer to FIG. 13) position of the micro connector relative to its corresponding adapter receptacle. In a locked position for the release arm, the micro connector is removed from its corresponding adapter receptacle upon a distal movement of the removal tool.

Upon full insertion of the removal tool over a distal end of a micro connector pull/push tab 8710 (as depicted in FIG. 12), latch 8775*d* is locked into first locking recess 8775*e*.1. This prevents further rearward movement of release arm 8775 from the removal tool 8770 to prevent the removal tool from being inactive. Release arm 8775 further comprises release arm protrusion 8775*b*, where protrusion 8775*d* causes locking arm 8770*c* locking protrusion 8770*c*.1 to move out of recess 8773 when release arm 8775 is move forward or in proximal direction, as depicted in FIG. 13.

Referring to FIG. 14, as release arm 8775 is moved forward, the latch 8775*d* moves out of first locking recess 8775*e*.1 to second locking recess 8775*e*.2, and in this position, release arm is in an unlocked position. In an unlocked position (refer to FIG. 13), the micro connector is not removed from an adapter (not shown). In a locked position, FIG. 14, the release arm will remove the micro connector from the adapter (not shown) when release tool 8770 is displaced in the direction of arrow "R". Still referring to FIG. 14, as release arm 8775 is moved proximal, release arm locking protrusion 8775*d* flexes out in direction of "F", as release arm locking protrusion is moved proximally into removal tool housing 8770*a* as depicted in FIG. 13.

FIG. 14 includes locking arm 8770*c*. Locking arm 8770*c* is integrated to removal tool housing 8770*a*. Locking arm 8770*c* is also connected to release arm 8775 by latch 8775*d*. In operation one pulls or pushes release arm 8775*a* which moves locking arm 8770*c* protrusion 8770*c*.1 in or out of recess 8773*a*.

Figure 15:
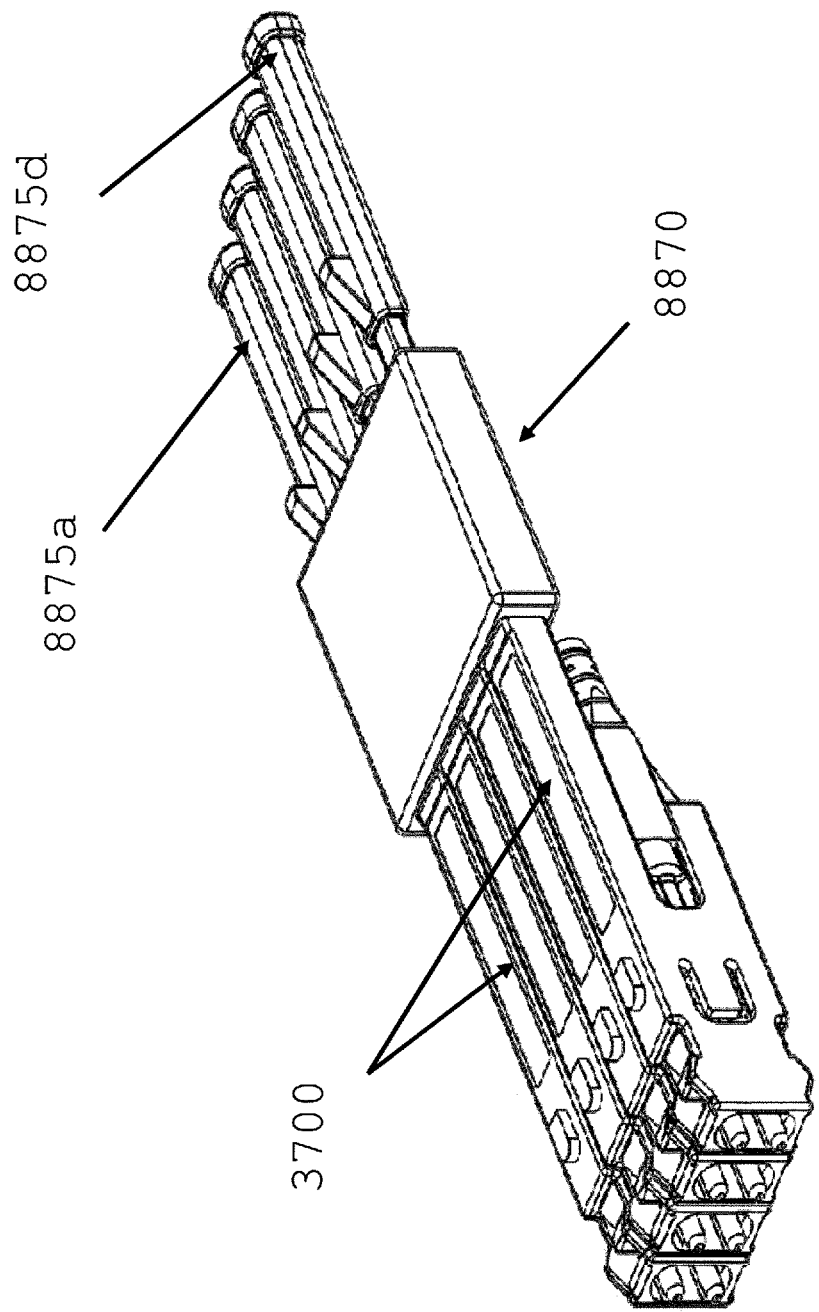
FIG. 15 is a perspective view of the removal tool of FIG. 12 with removal tool release arms in an asymmetric layout.

FIG. 15 depicts a plural of micro connector 3700 or 5300 comprising a plural of release arms 8875 configured asymmetric or offset for easy access. Offset release arm 8875*a* is shorter or nearer removal tool 8870 than release arm 8875*d*. The operation of removal tool 8870 in FIG. 15 is the same as removal tool 8770 as described in FIG. 13 and FIG. 14.

FIGS. 16-19 depict a fifth embodiment of a removal tool and its operation. FIG. 16 depicts removal tool assembly 8900 having a plural of micro connectors 3700 with pull/push tab 8910 and recess 8973 at the distal end of tab 8910*a*-9810*d*. Each recess 8973*a* has pair of walls (8973*a*.1, 8973*a*.2).

FIG. 17 depicts plural of micro connectors 3700 with removal tool 8975 of FIG. 18 installed into the recesses 8973*a*-8973*d* of the plural of micro connectors of FIG. 16.

FIG. 18 depicts a sixth embodiment of removal tool 8975 having body 8975*a*, plural of a pair of flexible arm 8975*f*.1 and 8975*f*.2 sets, and each arm has a corresponding chamfer 8975*g*.1 and 8975*g*.2. Set of flexible arms (8975*f*.1, 8975*f*.2) is inserted into recess 8973 of corresponding push/pull tab 8910. Chamfers 8975*g*.1, 8975*g*.2 aids in the insertion of the arms into the recess, and the orientation of the chamfer, as shown, ensures arm 8975*f* flexes inward as the chamfers engage with push/pull tab recess walls 8973*a*.1, 8973*a*.2 upon insertion of removal tool 8975 into recesses 8973*a*-8973*d*. Once the arm pair is through the recess, a shelf pair 8975*s*.1, 8975*s*.2 secures the removal tool within recess 8973*a*. Shelf 8975*s*.1 expands under wall 8975*f*.1 and shelf 8975*s*.2 expands under wall 8975*f*.2, thereby preventing flexible arms from being removed from its corresponding recess at the distal end of the fiber optic connector.

Figure 19:
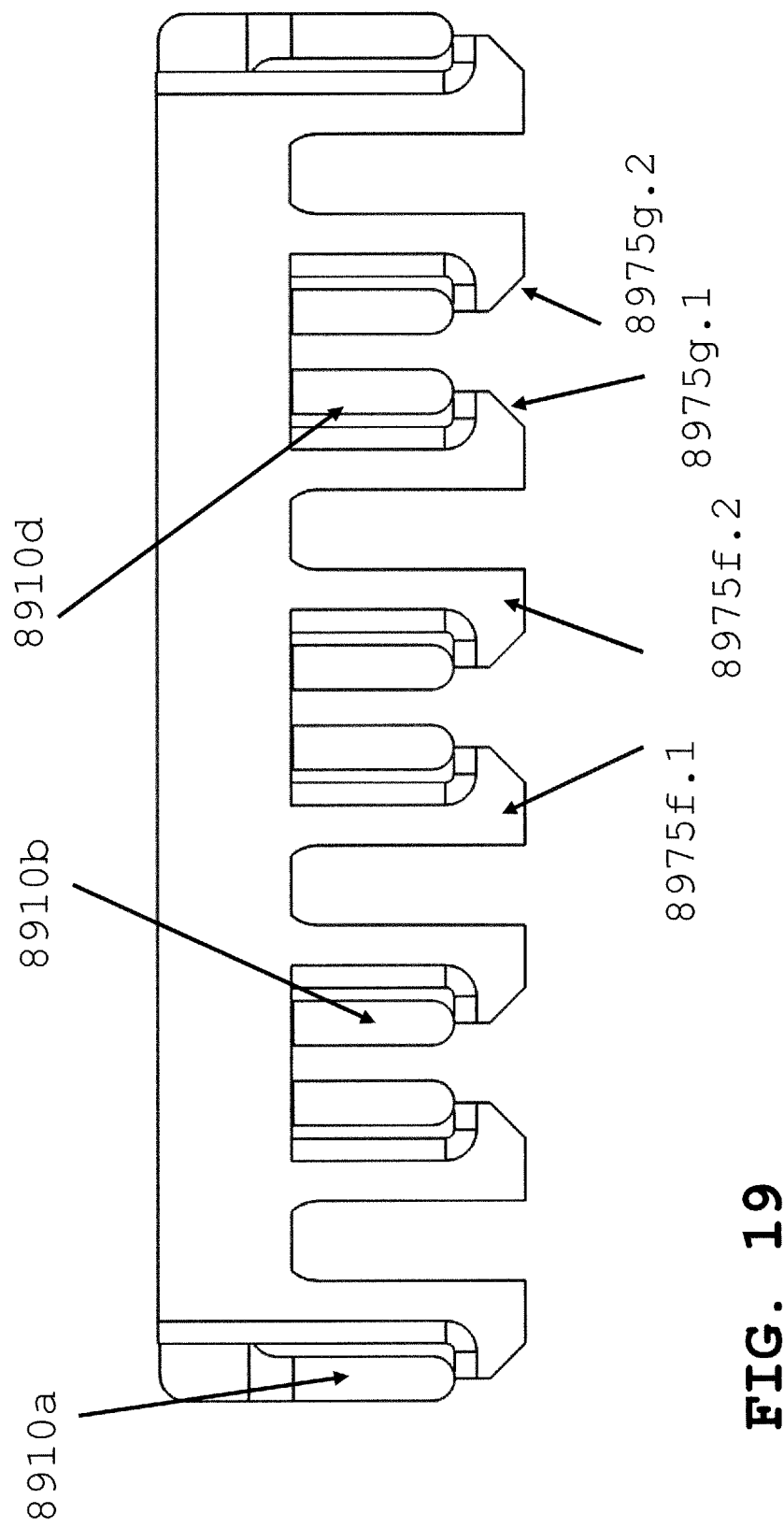
FIG. 19 is a cross section of the removal tool inserted into recesses at a distal end of the micro connectors of FIG. 17.

FIG. 19 depicts a cross section of removal tool 8975 inserted into recesses 8973*a*-8973*d* of the plural of push/pull tab 8910*a*-*d*. Without departing from the scope of the invention, the tool 8975 may have two or more arm sets side by side or spaced apart for insertion in any number of recess of a plural of micro connectors.

FIGS. 20.1 to 20.3 depict a seventh embodiment of a removal tool. FIG. 20.1 depicts removal tool 9075 extends the length of pull/push tab 9010 as shown in FIG. 20.2. Removal tool 9075 or extender further comprises a pair of extender arms 9075*h* each with wing 9075*j*. Referring to FIG. 20.2, extender arms 9075*h* snap into recess 9073 (refer to FIG. 20.3) at the distal end of push/pull tab 9010. The extender length may be varied to accommodate an asymmetric configuration similar to FIG. 15. Referring to FIG. 20.3, single tool 9075 may be installed at a distal end of one of the plural of micro connectors to remove that individual micro connector.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein. An element 3700 refers to the item such as a connector while 3700a, 3700b, 3700c or 3700d refers to a plural of the individual item.

The invention claimed is:

1. A removal tool for simultaneously releasing a plurality of fiber optic connectors from an adapter receptacle, each fiber optic connector further comprises a push/pull tab, each push/pull tab having a proximal end portion and an opposite distal end portion configured to be spaced apart from the adapter receptacle by a greater distance than the proximal end portion when the fiber optic connectors are mated with the adapter receptacle, each push/pull tab having a recess at the distal end portion thereof, the removal tool comprising:

a housing having a proximal end portion and a distal end portion spaced apart along a first axis and a first side portion and a second side portion spaced apart along a second axis, the proximal end portion being spaced apart from the distal end portion in a distal-to-proximal direction along the first axis, the housing comprising one or more release arms, the one or more release arms comprising one or more release arm protrusions and the one or more release arms being deflectable relative to at least one of the proximal end portion and the distal end portion of the housing, wherein the housing is configured to be loaded onto the distal end portions of the push/pull tabs of the plurality of fiber optic connectors by movement relative to the plurality of fiber optic connectors in the distal-to-proximal direction so that the one or more release arm protrusions are accepted in the recesses of the push/pull tabs of the plurality of fiber optic connectors at the same time for locking the removal tool with the plurality of fiber optic connectors, wherein the plurality of fiber optic connectors are spaced apart along the second axis when the one or more release arm protrusions are accepted in the recesses of the push/pull tabs of the plurality of fiber optic connectors at the same time;

wherein when the one or more release arm protrusions are accepted in the recesses of the push/pull tabs of the plurality of fiber optic connectors at the same time, the removal tool can be selectively operated to:

release the plurality of fiber optic connectors from the adapter receptacle by displacing the removal tool distally; and disconnect from the plurality of the fiber optic connectors upon deflecting the one or more release arms wherein each of the one or more release arms has a distal end portion and a proximal end portion spaced apart along the first axis, wherein each release arm is cantilevered from the distal end portion of the housing such that the distal end portion of each release arm adjoins the distal end portion of the housing.

2. The removal tool assembly for releasing one or more fiber optic connectors from an adapter receptacle according to claim 1, wherein the housing is formed from a single piece of material.

3. A combination comprising the removal tool of claim 1 and a plurality of fiber optic connectors, each fiber optic connector comprising a push/pull tab, each push/pull tab having a recess at a distal end thereof configured to accept the one or more release arm protrusions to operatively couple the removal tool to the plurality of fiber optic connectors.

4. The removal tool assembly for releasing one or more fiber optic connectors from an adapter receptacle according to claim 1, wherein the housing comprises a wall and the one or more release arms comprises a plurality of release arms formed on the wall at a plurality of spaced apart locations along the second axis.

5. The removal tool assembly as set forth in claim 1, wherein the proximal end portion of each release arm is spaced apart from the proximal end portion of the housing by a gap extending along the first axis.

* * * * *